United States Patent
Chen et al.

(10) Patent No.: US 12,063,260 B2
(45) Date of Patent: Aug. 13, 2024

(54) INTELLIGENT DELIVERY AND PLAYOUT TO PREVENT STALLING IN VIDEO STREAMING

(71) Applicant: Rovi Guides, Inc., San Jose, CA (US)

(72) Inventors: Tao Chen, Palo Alto, CA (US); Reda Harb, Issaquah, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/899,732

(22) Filed: Aug. 31, 2022

(65) Prior Publication Data

US 2024/0073268 A1    Feb. 29, 2024

(51) Int. Cl.
*H04L 65/612* (2022.01)
*H04L 65/752* (2022.01)
(Continued)

(52) U.S. Cl.
CPC .......... *H04L 65/612* (2022.05); *H04L 65/752* (2022.05); *H04N 21/44004* (2013.01); *H04N 21/44209* (2013.01)

(58) Field of Classification Search
CPC ..... H04L 65/612; H04L 65/752; H04L 65/80; H04N 21/44004; H04N 21/44209; H04N 21/44; H04N 41/442
See application file for complete search history.

(56) References Cited

U.S. PATENT DOCUMENTS 8,156,138 B2    4/2012    Kohn et al.
9,756,101 B2    9/2017    Glynn
(Continued)

FOREIGN PATENT DOCUMENTS

CN    105451075 B    7/2018
DE    69830625 T2    5/2006
(Continued)

OTHER PUBLICATIONS

U.S. Appl. No. 17/899,736, filed Aug. 31, 2022, Tao Chen.
(Continued)

*Primary Examiner* — Tonia L Dollinger
*Assistant Examiner* — Mehulkumar J Shah
(74) *Attorney, Agent, or Firm* — Haley Guiliano LLP

(57) ABSTRACT

Systems and methods are disclosed to mitigate stalling of streaming content due to rebuffering so that, e.g., the content consumer does not experience gaps in playback. In some embodiments, by buffering streaming content simultaneously at two bitrate levels—e.g., one of the lowest bitrates and a better-quality bitrate, within the bandwidth limitations—rebuffering-caused gaps in playback of a higher quality (HQ) stream may be filled with a lower quality (LQ) stream. For instance, client-side dual buffers may store n segments from the HQ stream during a given time and a multiple of n number of segments from the LQ stream, thus allowing for many of the LQ segments to be output if the HQ stream is rebuffering. If a segment of content is beginning to be played back as an LQ segment, there is no reason to buffer the same segment from the HQ stream. Moreover, after a segment of content is played back (or decoded) as either HQ or LQ, the corresponding HQ segment and/or LQ segment may be discarded from the dual buffer, e.g., to create buffer space for upcoming segments.

20 Claims, 11 Drawing Sheets

(51) Int. Cl.
*H04N 21/44* (2011.01)
*H04N 21/442* (2011.01)

(56) References Cited

U.S. PATENT DOCUMENTS

| | | |
|---|---|---|
| 9,942,577 B1 | 4/2018 | Burford et al. |
| 10,116,719 B1 | 10/2018 | Li et al. |
| 10,244,016 B1 | 3/2019 | Binns et al. |
| 10,536,500 B2 | 1/2020 | Halepovic et al. |
| 10,542,315 B2 | 1/2020 | Shaw et al. |
| 10,735,489 B1 | 8/2020 | Joliveau et al. |
| 11,201,904 B2 | 12/2021 | Stumbo |
| 11,374,998 B1* | 6/2022 | Halepovic ............... H04L 65/75 |
| 11,470,355 B1 | 10/2022 | Persiantsev |
| 11,632,413 B1 | 4/2023 | Chen |
| 2002/0040320 A1 | 4/2002 | Tanaka |
| 2008/0043643 A1 | 2/2008 | Thielman et al. |
| 2009/0281923 A1 | 11/2009 | Selinger et al. |
| 2011/0179114 A1 | 7/2011 | Dilip et al. |
| 2012/0331106 A1* | 12/2012 | Ramamurthy .......... H04L 65/70 709/218 |
| 2013/0155068 A1 | 6/2013 | Bier et al. |
| 2013/0179440 A1 | 7/2013 | Gordon |
| 2013/0185158 A1 | 7/2013 | Feng et al. |
| 2013/0282917 A1 | 10/2013 | Reznik et al. |
| 2013/0332438 A1 | 12/2013 | Li et al. |
| 2014/0006951 A1 | 1/2014 | Hunter |
| 2014/0223481 A1 | 8/2014 | Fundament |
| 2014/0241415 A1 | 8/2014 | Su et al. |
| 2014/0289764 A1 | 9/2014 | Mallika |
| 2014/0297666 A1 | 10/2014 | Morris |
| 2015/0169701 A1 | 6/2015 | Stekkelpak et al. |
| 2015/0256581 A1* | 9/2015 | Kolhi ...................... H04L 65/80 709/219 |
| 2015/0296047 A1* | 10/2015 | Ghazisaidi ............ H04L 65/612 709/219 |
| 2016/0012795 A1 | 1/2016 | Banski et al. |
| 2016/0065995 A1 | 3/2016 | Phillips |
| 2016/0205162 A1 | 7/2016 | Zhang et al. |
| 2017/0302717 A1* | 10/2017 | Karlsson .......... H04N 21/44209 |
| 2017/0346871 A1 | 11/2017 | Zanger et al. |
| 2017/0374121 A1 | 12/2017 | Phillips et al. |
| 2018/0054651 A1 | 2/2018 | Mallika |
| 2018/0109468 A1* | 4/2018 | Sridhar ............. H04W 28/0205 |
| 2018/0115475 A1 | 4/2018 | Broom et al. |
| 2019/0334824 A1* | 10/2019 | Jana ...................... H04L 47/823 |
| 2019/0387426 A1 | 12/2019 | Lee |
| 2020/0077132 A1 | 3/2020 | Sivaramalingam et al. |
| 2020/0177660 A1 | 6/2020 | Connor et al. |
| 2020/0351201 A1* | 11/2020 | Li ........................ G06F 11/3006 |
| 2021/0136435 A1* | 5/2021 | Stobbart .......... H04N 21/23439 |
| 2021/0152892 A1 | 5/2021 | Ramaswamy |
| 2022/0374197 A1 | 11/2022 | Carrigan |
| 2024/0022623 A1 | 1/2024 | Chen |

FOREIGN PATENT DOCUMENTS

| | | |
|---|---|---|
| EP | 2615790 A1 | 7/2013 |
| WO | 2007130879 A2 | 11/2007 |
| WO | 2013043923 A1 | 3/2013 |
| WO | 2014011848 A2 | 1/2014 |
| WO | 2016151974 A1 | 9/2016 |

OTHER PUBLICATIONS

U.S. Appl. No. 17/867,442, filed Jul. 18, 2022, Tao Chen.
Bai , et al., Bai et al., "Video quality temporal pooling using a visibility measure," Proceedings of IEEE International Conference on Multimedia and Expo (ICME) 2019.
Bampis , et al., Bampis et al., "Towards perceptually optimized adaptive video streaming—A realistic quality of experience database," IEEE Transactions on Image Processing, vol. 30, pp. 5182-5197 (2021).
Duanmu , et al., Duanmu et al., "Quality-of-Experience for adaptive streaming videos: An expectation confirmation theory motivaed approach," IEEE Transactions on Image Processing, vol. 27, No. 12 pp. 6135-6146 (2018).
Rodriguez , et al., Rodriguez et al., "the impact of video-quality-level switching on user quality of experience in dynamic adaptive streaming over HTTP," EURASIP Journal on Wireless Communications and Networking, 2014:216 (2014).
Tavakoli , et al., Tavakoli et al., "Perceptual quality of HTTP adaptive streaming strategies: Cross-experimental analysis of multi-laboratory and crowdsourced subjective studies," IEEE Journal on Selected Areas in Communications, vol. 34, No. 8, pp. 2141-2153 (2016).
Tu , et al., Tu et al., "A comparative evaluation of temporal pooling methods for blind video quality assessment," Proceedings of IEEE International Conference on Image Processing (ICIP) 2020.
U.S. Appl. No. 18/122,241, filed Mar. 16, 2023, Tao Chen.
Mok, R. K. P. , et al., "QDASH: A QoE-aware DASH system," Proceeding MMYsys '12 Proceedings of the 3rd Multimedia Systems Conference, 11-22 (2012).

* cited by examiner

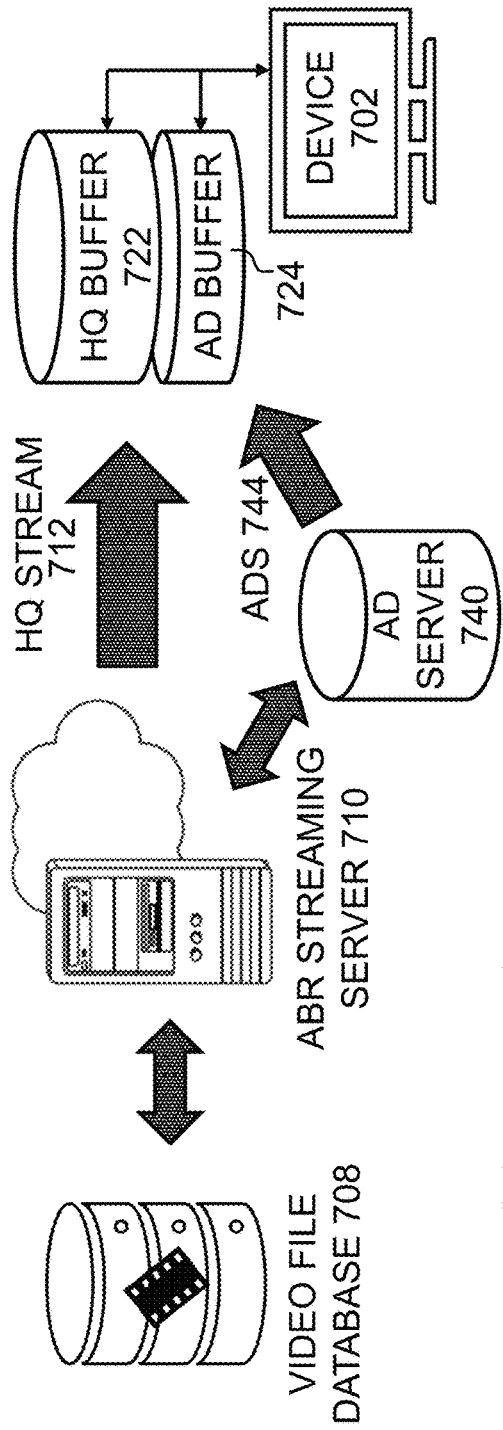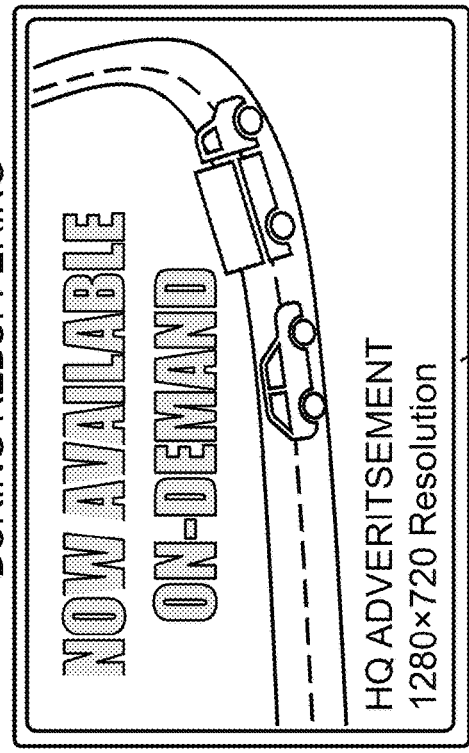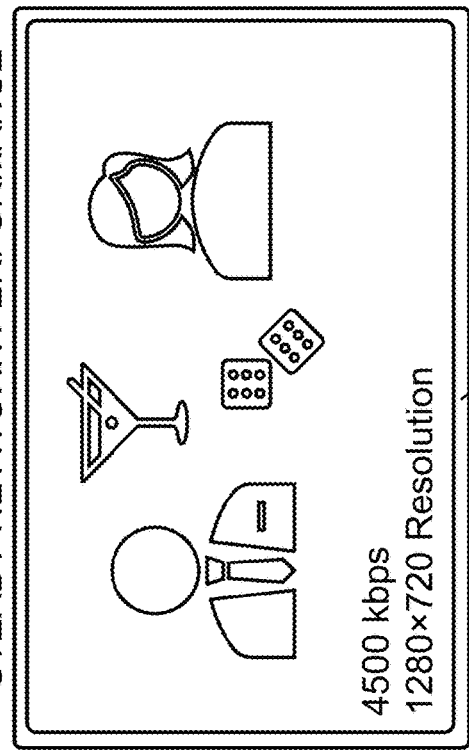
FIG. 7

800 – SUPPLEMENTAL CONTENT DURING QoE EVENTS

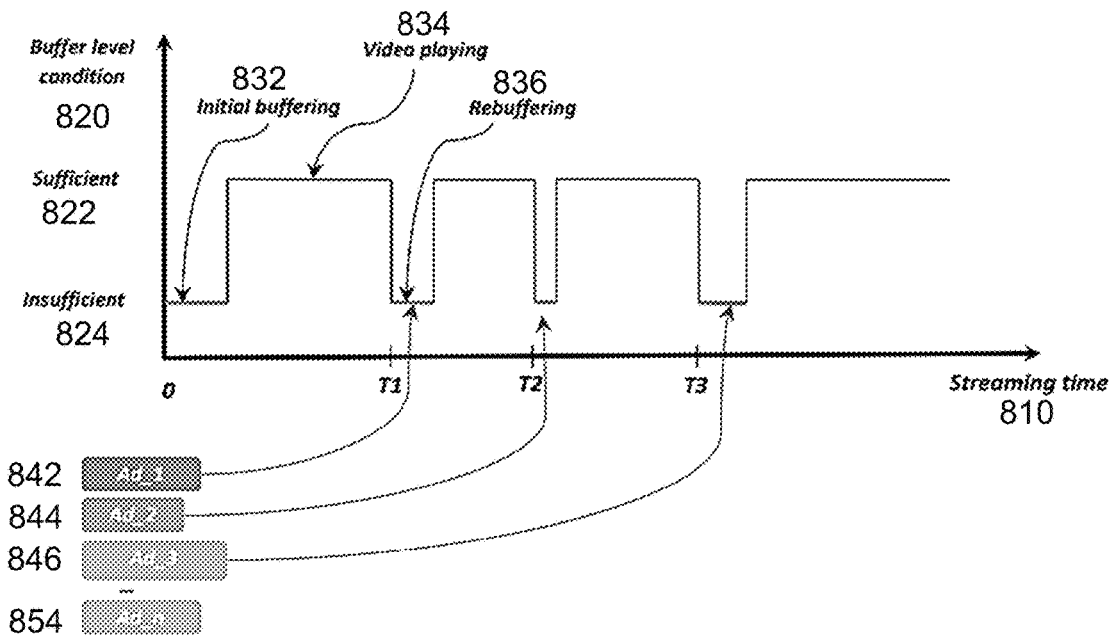

MANIFEST FILE 840

```
#EXTM3U
#EXT-X-VERSION:4
#EXT-X-TARGETDURATION:10
#EXTINF:10,
...                               860
SUPPLEMENTAL_CONTENT_QUEUE={
842  "Ad_1","http://www.adserver.com/files/ad_1.mp4";
844  "Ad_2","http://www.adserver.com/files/ad_2.mp4";
846  "Ad_3","http://www.adserver.com/files/ad_3.mp4";
848  "Promo_4","http://www.adserver.com/files/promo_4.mp4";
850  "Preview_5","http://www.adserver.com/files/prev_5.mp4";
852  "BTS_6","http://www.adserver.com/files/bts_6.mp4";
...
854  "Ad_n","http://www.adserver.com/files/ad_n.mp4";
...
}
...
```

INTELLIGENT DELIVERY AND PLAYOUT TO PREVENT STALLING IN VIDEO STREAMING

BACKGROUND

The present disclosure relates to content delivery, and more particularly to systems and related processes for maintaining quality of experience (QoE) during adaptive bitrate (ABR) streaming of content.

SUMMARY

ABR streaming of content is generally adept at handling volatile network conditions, but there are other challenges to objective QoE with content consumption. Some key challenges in video streaming are QoE disturbance events such as rebuffering. When a content stream cannot be streamed fast enough to keep playing at normal speed, rebuffering (and/or buffering) may occur and content playback may pause and notably degrade the viewing experience. Because the network conditions may still often be unstable and/or unpredictable, rebuffering events may be inevitable, even with ABR streaming, e.g., in areas with poor network coverage and/or intermittent low bandwidth. There exists a need to prevent and/or reduce content stalling during ABR content streaming. As described herein, playback stalling of streaming content due to rebuffering may be mitigated with a graceful gradation so that, e.g., the content consumer does not experience pauses in playback. In some embodiments, by buffering streaming content simultaneously at two bitrate levels—e.g., one of the lowest bitrates and a better-quality bitrate, within the bandwidth limitations—rebuffering-caused stalls in playback of a higher quality (HQ) stream may be eliminated by playing a lower quality (LQ) stream.

Generally, ABR streaming is a technique used in streaming content over networks. In many cases, adaptive streaming technologies may be based on HTTP (Hypertext Transfer Protocol) and designed to work efficiently over large, distributed HTTP-based networks such as the Internet. ABR streaming works by detecting a bandwidth at a client (e.g., user device) and adjusting the quality of the media stream accordingly, e.g., in real time. For example, a client application, together with a server, may switch between streaming different quality encodings of a media content item depending on available resources, which can lead to very little buffering, fast start time and a good experience for both high-end and low-end connections.

Adaptive bitrate streaming has been widely deployed. ABR streaming is responsive to user and network events and can be used in demanding scenarios, e.g., low-latency live streaming. Many service providers deploy HTTP Adaptive Streaming (HAS) through Dynamic Adaptive Streaming over HTTP (DASH), or HTTP Live Streaming (HLS). Like other ABR methods, DASH achieves decoder-driven rate adaptation by providing video streams in a variety of bitrates and breaking them into small file segments. The media information of each segment is stored in a manifest file, which is created at server and transmitted to clients to provide the specification and location of each segment. Throughout the streaming process, the video player at the client and server adaptively switch among the available streams by selecting segments based on playback rate, buffer condition and instantaneous throughput. Typically, ABR algorithms that determine the bitrate of the next segment to download may not be defined within the standard but may be left open for optimization based on, e.g., maximizing audience QoE.

Quality of experience may often be a subjective characteristic for each viewer or content consumer, but detection of certain events may indicate poor QoE or a decrease in QoE. For example, stalling may occur when a client application is rebuffering streaming segments during the middle of playback. Streaming viewers are likely familiar with seeing a video stall and some variation of a spinning icon indicating when the stream is rebuffering. If there is a network issue and/or not enough bandwidth to download the next content segment, then the stream will stall and playback will not resume until the next segment is buffered and ready for decoding. Frequent stalling from rebuffering does not typically make a high-quality streaming experience.

Dynamically adjusting the bitrate via ABR streaming aims to minimize rebuffering but network characteristics are still unpredictable and stalling still happens. Generally, streaming at a higher bitrate means the video quality will be better, but if the bitrate exceeds a user's bandwidth at a given time, then buffer underrun can occur. In some cases, with a temporary bandwidth loss, the client buffer may be fed at a lower rate than from which it is being read. If network traffic peaks suddenly, streaming a segment from a HQ stream may be interrupted.

As described herein, playback stalling of streaming content due to rebuffering may be mitigated with a graceful gradation so that, e.g., the content consumer does not experience gaps in playback. In some embodiments, by buffering streaming content simultaneously at two bitrate levels—e.g., one of the lowest bitrates and a better-quality bitrate, within the bandwidth limitations—rebuffering-caused stalls in playback of a HQ stream may be eliminated by playing a LQ stream. For instance, client-side dual buffers may store n segments from the HQ stream during a given time and a multiple of n number of segments from the LQ stream, thus allowing for many of the LQ segments to be output if the HQ stream is rebuffering. If a segment of content is beginning to be played back as an LQ segment, there is no reason to buffer the same segment from the HQ stream. Moreover, after a segment of content is played back (or decoded) as either HQ or LQ, the corresponding HQ segment and/or LQ segment may be discarded from the dual buffer, e.g., to create buffer space for upcoming segments.

In some embodiments, stalling when streaming adaptive bitrate (ABR) content may be prevented by buffering two streams of a content item, e.g., one HQ and one LQ. For instance, a system may receive, from a server, a HQ stream of a content item and receive, from the server, a LQ stream of the content item (e.g., simultaneously). The system may begin to store in a first buffer a HQ segment corresponding to a first portion of the content item from the HQ stream and begin to store in a second buffer a first LQ segment corresponding to the first portion of the content item from the LQ stream and a second LQ segment corresponding to a portion following the first portion of the content item from the LQ stream. The system may determine whether a QoE disturbance event (e.g., rebuffering) is occurring or about to occur and, in response to determining that the QoE disturbance event is occurring or about to occur, provide (e.g., decode and playback) from the second buffer the first LQ segment for consumption. In response to determining that the QoE disturbance event is not occurring and not about to occur, the system may provide (e.g., decode and playback) from the first buffer the first HQ segment for consumption. In some embodiments, e.g., when the system is providing from the second buffer the first LQ segment for consumption, the system may determine whether the QoE disturbance event is still occurring and, in response to determining that the QoE disturbance event is still occurring, providing (e.g., decode and playback) from the second buffer the second LQ segment for consumption. If the system determines that the QoE disturbance event is not still occurring, the system may begin to store in the first buffer a second HQ segment corresponding to the portion following the first segment of the content item from the HQ stream and provide (e.g., decode and playback) from the first buffer the first HQ segment for consumption.

Some embodiments may play supplemental content such as advertisements when a stream is stalling. In some embodiments, by prefetching supplemental content while streaming HQ content (e.g., at adjustable bitrates), such supplemental content may be played back during times where the HQ stream is rebuffering or otherwise stalled. For instance, one or more advertisements may be downloaded while streaming HQ content and, when the HQ stream is rebuffering, the downloaded one or more advertisements may be played back during the stalling time.

In some embodiments, stalling when streaming adaptive bitrate (ABR) content may be prevented by providing supplemental content during stalling of the content playback (e.g., for rebuffering). Supplemental content may comprise, e.g., a commercial, an overlay, a promo, a preview, a behind-the-scenes clip, an interview, news, etc. Generally, a system, e.g., a client, may receive, from a streaming server, a stream of a content item and receive, from a content server, a manifest describing a plurality of supplemental content items (e.g., ads). The system may begin storing in a buffer a segment corresponding to a first portion of the content item from the stream and download, based on the manifest, a first supplemental content item from the plurality of supplemental content items. The system may determine whether a QoE disturbance event (e.g., rebuffering) is occurring or about to occur and, in response to determining that the QoE disturbance event is occurring or about to occur, provide (decode and playback) the downloaded first supplemental content item for consumption. If the system determines that the QoE disturbance event is not occurring and not about to occur, the system may provide (e.g., decode and playback) from the buffer the first segment for consumption.

In some embodiments, a QoE disturbance event may comprise rebuffering. In some embodiments, a QoE disturbance event may be anticipated based on data describing, e.g., buffer levels, bandwidth availability, system performance, and/or network traffic.

In some embodiments, a stall-preventative mode may be enabled, e.g., by a viewer, a content distributor, a content producer, a content host, etc. For instance, if a client application is only streaming a HQ stream but rebuffering occurs a predetermined number of times (e.g., 3) within a predetermined period of time (e.g., 35 min), then the client application may begin to simultaneously stream a HQ stream and a LQ stream and buffer both streams. In some embodiments, if a client application is only streaming a HQ stream but rebuffering occurs a predetermined number of times (e.g., 4) within a predetermined period of time (e.g., 45 min), then the client application may download a promotional video (or access a predownloaded advertisement) to playback during the next rebuffering of the HQ stream.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 depicts an illustrative streaming system with supplemental content provided during a QoE disturbance event, in accordance with some embodiments of the disclosure;

FIG. 8 depicts an illustrative scenario of a streaming system with supplemental content provided during a QoE disturbance event, in accordance with some embodiments of the disclosure;

DETAILED DESCRIPTION

Devices may be designed to facilitate content consumption. Content like video, animation, music, audiobooks, ebooks, playlists, podcasts, images, slideshows, games, text, and other media may be consumed by users at any time, as well as nearly in any place. Abilities of devices to provide content to a content consumer are often enhanced with the utilization of advanced hardware with increased memory and fast processors in devices. Devices—e.g., computers, telephones, smartphones, tablets, smartwatches, microphones (e.g., with virtual assistants), activity trackers, e-readers, voice-controlled devices, servers, televisions, digital content systems, video game consoles, security systems, cameras, hubs, routers, modems, and other internet-enabled appliances—can provide and/or deliver content almost instantly.

Delivering content via streaming has generally advanced through improved network speeds, however, network bandwidth will likely continue to be inconsistent. ABR streaming has allowed streaming to adjust to bandwidth fluctuations be having different bitrate versions of content item so that at any given instant a client application can request a segment of content at a bitrate acceptable for the current bandwidth. For instance, an exemplary ABR ladder may comprise 145 kbps with a resolution of 416×234, 365 kbps with a resolution of 640×360, 730 kbps with a resolution of 768×432, 1100 kbps with a resolution of 768×432, 2000 kbps with a resolution of 960×540, 3000 kbps with a resolution of 1280×720, 4500 kbps with a resolution of 1280×720, 6000 kbps with a resolution of 1920×1080, and 7800 kbps with a resolution of 1920×1080. Still, even using ABR streaming to dynamically adjust between bitrate levels to match available bandwidth, a stream may overrun its buffer, triggering rebuffering. Each time an ABR streaming video stalls, the quality of experience may diminish.

As used herein, QoE disturbance events generally refer to events that cause, or potentially could cause, stalling of content playback due to rebuffering. QoE disturbance events may comprise rebuffering, loss of connection (LAN or WAN), bandwidth reduction, increased competing network traffic, scarcity of system resources, and other potential issues with a network, bandwidth, or system functions. Generally, as disclosed herein, there may be graceful degradation of the viewing experience during QoE disturbance events by preparing for these moments with, e.g., lower quality streaming content (or alternative content) to be played during times where viewers may normally see a frozen screen and a rebuffering indicator.

Figure 1:
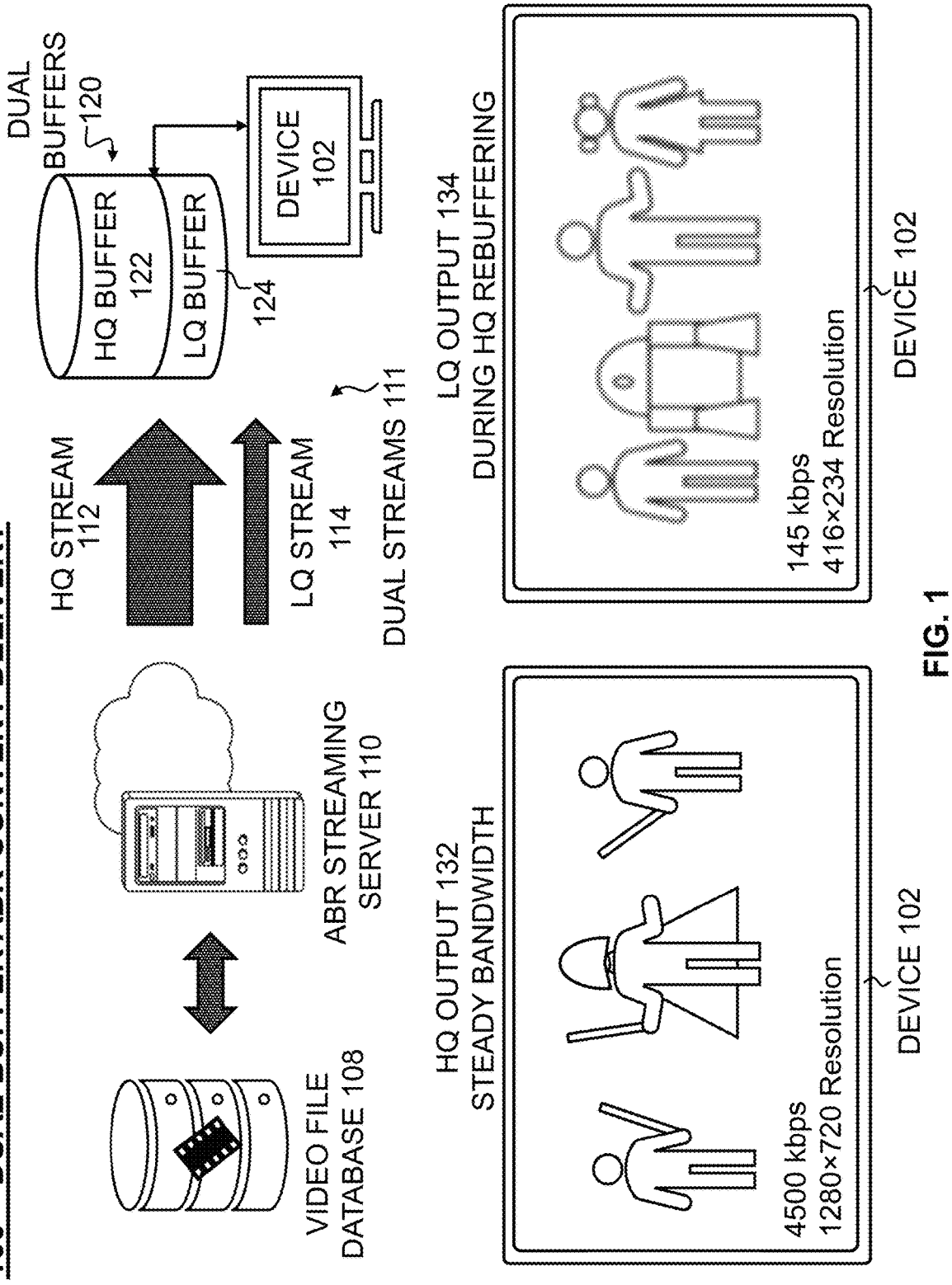
FIG. 1 depicts an illustrative dual-buffer content streaming system, in accordance with some embodiments of the disclosure.

FIG. 1 depicts an illustrative dual-buffer content streaming system, in accordance with some embodiments of the disclosure. Generally, scenario 100 of FIG. 1 depicts ABR streaming of content from an ABR streaming server 110 to user device 102 using dual streams 111 and storing segments in dual buffers 120.

In some embodiments, by receiving two streams—e.g., one low quality (LQ) stream 114 and one high quality (HQ) stream 112—device 102 can buffer the HQ stream in HQ buffer 122 and the LQ stream in a LQ buffer 124, respectively, and output content from LQ buffer 124 in cases where HQ buffer 122 stalls, e.g., due to rebuffering. Device 102 may provide HQ output 132, e.g., during times of steady bandwidth and may provide LQ output 134 during times of HQ stream rebuffering. Exemplary HQ output 132 is depicted as coming from a stream of 4500 kbps with 1280×720 resolution. Exemplary LQ output 134 is depicted as coming from a stream of 145 kbps with 416×234 resolution. Device 102 is depicted as a television but may generally be any streaming client device (or client application running on a device), e.g., such as those depicted in FIGS. 10 and 11. ABR streaming server 110, along with video file database, are depicted as cloud devices but may generally be any device or application run on a device, e.g., such as those depicted in FIGS. 10 and 11.

In some embodiments, ABR streaming server 110 will be in communication, via a network, with video file database 108. In some embodiments, video file database 108 may store different quality versions of each content item (e.g., video file), and each version of a content item as individual segments to be requested by an ABR client on device 102 via ABR streaming server 110. For instance, one film may comprise 10 different quality level versions (e.g., ranging from 145 kbps with a resolution of 416×234 to 85 Mbps for high frame rate 4K resolution) and each version may be divided up into segments ranging, e.g., 2-10 seconds in duration. Generally, using ABR streaming, a client application may request a segment from a stream at a specific bitrate appropriate for the current bandwidth and request different bitrates for following segments based on bandwidth fluctuations. Sometimes, for example, when the available bandwidth cannot deliver content as fast as the content is being played back, the playback will stall, and the content will be rebuffering.

In scenario 100, a client application requests to receive two streams simultaneously from ABR streaming server 110, dual streams 111, with one stream at HQ bitrate 112 and the other stream at LQ bitrate 114. In scenario 100, HQ stream 112 is delivered to device 102 and stored in HQ buffer 122 of dual buffers 120. In some embodiments, HQ stream 712 may be dynamically adapting bitrates. In scenario 100, LQ stream 114 is delivered to device 102 and stored in LQ buffer 124 of dual buffers 120. In some embodiments, LQ stream 114 may be dynamically adapting bitrates. With a steady bandwidth, a client application may typically play the stream at the HQ bitrate 112, e.g., as HQ output 132; however, at times when there is insufficient data in HQ buffer 122, the next segment at LQ bitrate 114 from LQ buffer 124, e.g., LQ output 134, may be played back seamlessly. Segments from LQ buffer 124 may be played back until HQ buffer 122 is ready after rebuffering.

Streaming an additional LQ stream may use bandwidth that would otherwise be available for a HQ stream, but a LQ stream may be by a large factor smaller than the HQ stream. For instance, with a 6 Mbps bandwidth an ABR client may select a bitrate level of 6000 kbps with a resolution of 1920×1080, with the stream stepping down to 4500 kbps with a resolution of 1280×720 or 3000 kbps with a resolution of 1280×720 if bandwidth is restricted at times. However, even with ABR adjustments, rebuffering may still occur, so a dual stream solution may affect the HQ bitrate selection.

Using dual streams 111 in scenario 100, selecting a HQ stream 112 must take into consideration the bitrate of LQ stream 114. Said another way, scenario 100 may be interpreted as a combination of (a) streaming a low bitrate version at a bandwidth that is multiple times larger than the video bitrate and (b) streaming a high bitrate version, the highest possible that is estimated by the server/client.

In scenario 100, for example, with a 6 Mbps bandwidth an ABR client may select a HQ first stream with a bitrate level of 4500 kbps with a resolution of 1280×720 and a LQ second stream with a bitrate level of 145 kbps with a resolution of 416×234. In such a situation, with the LQ second stream bitrate being at least 30 times smaller than the HQ first stream bitrate, the LQ buffer can store many (at least 30 times) more segments than the HQ buffer and, thus, the LQ buffer can run significantly ahead in time of the HQ buffer. For example, if all segments of a given bitrate are considered equal in file size, during the time a client application downloads segment number 278 at a HQ bitrate (4500 kbps), the client application can download segments 278 through 307 at a LQ bitrate (145 kbps).

Figure 6:
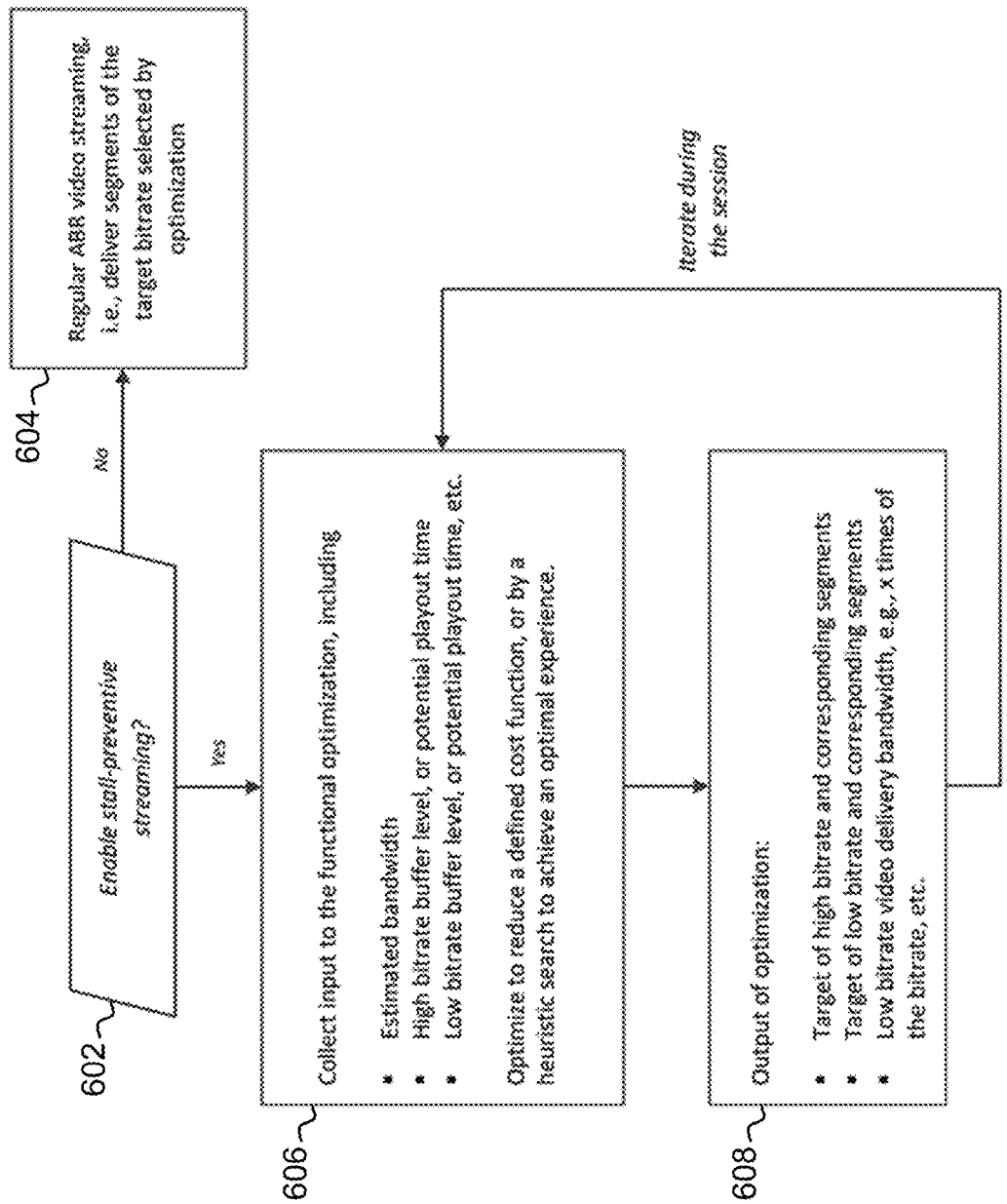
FIG. 6 depicts a flowchart of an exemplary process for determining target bitrates to steam in a dual-buffer content streaming system, in accordance with some embodiments of the disclosure.

Choosing the lowest available bitrate as LQ stream 114 may be practical. Across the bitrate ladder, streaming the lowest bitrate would most certainly guarantee reduced amount of video stalling and prevent LQ buffer 124 underrun. This may come at the cost of consistently poor video quality, a highly degraded QoE overall if LQ output 134 appears too often. In addition to the lowest bitrate choice, having flexibility to add a higher bitrate version to the ABR ladder for HQ stream 112 can therefore improve the video quality and viewing experience. For instance, streamers with 80 Mbps of bandwidth may prefer dual streams of 75 Mbps 4K-quality content as an HQ stream and an LQ stream of 750 kbps over a combination with 60 Mbps 4K-quality content as an HQ stream and an LQ stream of 5 Mbps. It may be a balance for each situation. An exemplary preventive streaming process is illustrated in FIG. 6. In some embodiments, sacrificing bitrate for the HQ stream may be preferable in order to improve quality of the LQ stream. In some embodiments, settings may be available for viewers to indicate a preference to high quality first streams or higher quality backup streams. In some embodiments, selected bitrates for HQ stream 112 and LQ stream 114 may vary based on how often rebuffering is occurring or how quickly an HQ stream may be rebuffered. For instance, if rebuffering rarely occurs, then LQ stream 114 may be a higher bitrate and not need to extend out in time too long.

Figure 2:
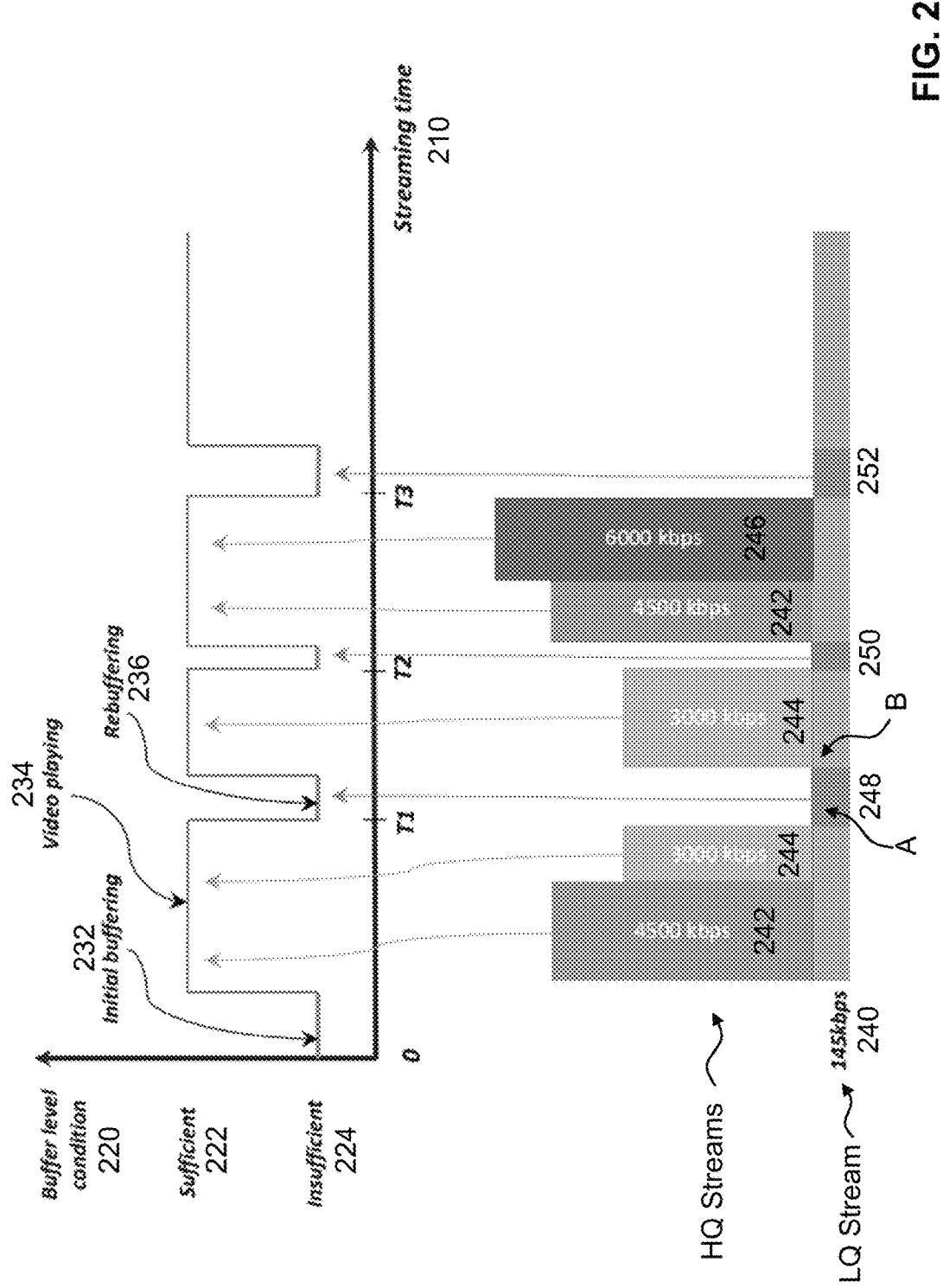
FIG. 2 depicts an illustrative scenario for delivering content segments in a dual-buffer streaming system, in accordance with some embodiments of the disclosure.

FIG. 2 depicts an illustrative scenario for delivering content segments in a dual-buffer streaming system, in accordance with some embodiments of the disclosure. Generally, chart 200 of FIG. 2 depicts buffer level condition 220 over streaming time 210. In some embodiments, the buffer of chart 200 may be a dual buffer, such as dual buffers 120 as depicted in scenario 100 in FIG. 1. Buffer level condition 220 is shown as having one of two conditions: sufficient condition 222 and insufficient condition 224.

Generally, in ABR video streaming, the best bitrate of each segment is determined and streamed. In some cases, bandwidth may be underutilized from time to time. For instance, if a client has an average of 5 Mbps of bandwidth most of time, the server may likely stream segments alternating between 4.5 Mbps and 6 Mbps from the ABR ladder, e.g., so that the buffer level remains healthy for continuous playback. This combination may be optimized under a constraint of streaming a single optimal bitrate.

In some cases, rebuffering may cause a stall of playback. For instance, assuming that the streaming content is a 10-minute video, a possible rebuffering may occur at the 1-minute mark due to unpredictable network conditions, and the user experiences a pause and waits. If the video can continue playing at a lower resolution, it is at least a continuous playback and much more desirable than stalling.

Continuous playback, e.g., using a lower bitrate stream as a backup during video stalling, can be achieved by streaming both 4.5 Mbps and 145 kbps segments from the start. Based on an estimated average of 5 Mbps bandwidth, a 145 kbps version can be streamed three times faster, e.g., at about 500 kpbs, while streaming a 4500-kbps bitrate version simultaneously. In any given second of 5 Mbps bandwidth, a client may be able to download one 4500-kbps bitrate segment and three 145-kbps bitrate segments. Because more segments of a LQ version may be streamed during the same time for buffering a HQ bitrate version, at least the first 3 minutes of 145 kpbs can in fact become available by the time when the video stall occurs at the 1-minute mark. During rebuffering, the client application can opt to decode the 145 kbps segments while waiting for the network conditions to improve, and later resume receiving and decoding the stream at a higher bitrate.

In chart 200, during initial buffering 232, starting at time 0, there is insufficient data in the buffer. With initial buffering 232, the client buffers both LQ stream 240, at 145 kbps, and HQ stream 242, at 4500 kbps. Next, the streaming video begins playing, e.g., indicated as video playing 234. After video playing 234, the HQ bitrate adapts and HQ stream 244, at 3000 kbps, is streamed until the buffer level condition 220 is insufficient 224, at T1. At T1, during rebuffering 236, LQ stream segments 248 are played back until the HQ buffer is sufficient 222. After rebuffering 236, when buffer level condition 220 is sufficient 222, HQ stream 244, at 3000 kbps, is decoded and played until buffer level condition 220 is again insufficient 224, at T2. Rebuffering occurs at T2 and LQ stream segments 250 are played back until the HQ buffer is sufficient 222. After rebuffering again, when buffer level condition 220 is sufficient 222, HQ stream 242, at 4500 kbps, is decoded and played. Next, the HQ bitrate adapts and HQ stream 246, at 6000 kbps, is streamed until buffer level condition 220 is again insufficient 224, at T3. Rebuffering occurs at T3 and LQ stream segments 252 are played back until the HQ buffer is sufficient 222 again and the process continues.

In some embodiments, the choices of low bitrates and high bitrates can be determined based on the estimation of bandwidth. It is not always necessary to stream the lowest bitrate in the ladder. If a HQ stream is selected to leave enough bandwidth to allow the LQ stream to be streamed multiple times faster, then the low bitrate version can be streamed at a much higher speed, depending on the estimation of bandwidth as well as the optimization for an optimal QoE. In some embodiments, the choice of low bitrate can vary depending on the input conditions to the optimization. For instance, 145 kbps is selected and streamed from the start, but later it can opt for delivering 365 kbps instead if it does not negatively impact the video QoE of high bitrate, especially as the LQ buffer becomes significantly ahead of the HQ buffer. In some embodiments, the quality indication of ABR bitrates is available through the encoding production and embedded in manifest. The ABR bitrates in the manifest file may be used by the server to determine the best choices to stream considering various aspects of input to the functional optimization.

In some embodiments, the priorities of ensuring continuous video playback as compared to the highest picture quality may be configured or customized by, e.g., the user, the application, the content delivery service, etc. Such configurability may help ensure an optimal interactive video streaming experience. In some embodiments, the availability, or delivery, of high bitrate segments is not necessarily continuous. For instance, the adaptation of bitrates may be dynamic so that the replacement with a high bitrate may be skipped if a corresponding segment of low bitrate has started playing. In some embodiments, when necessary, this can also happen if the quality increase is not as significant, especially for some stationary or low complexity scenes.

In some embodiments, the buffering of the low bitrate may be dynamic. For example, the LQ segment bits can be purged once the corresponding HQ bitrate segment is delivered and available for decoding. On the other hand, the buffering of low bitrate may not be continuous in terms of the segment-by-segment decoding order, and the playback of those segments may not be continuous, as illustrated in FIG. 3.

In some embodiments, managing the dual buffers may require streaming segments ahead, e.g., so that segments played back as LQ stream 240 during rebuffering are not redundantly streamed as a HQ stream. Point A of chart 200 depicts that some HQ bitrate segments are no longer to be streamed since the playback is replaced by the corresponding LQ bitrate. In some embodiments, this may be performed similarly to a scenario in normal ABR video streaming where low bitrate segments are selected and streamed, e.g., a step down in quality to save bandwidth before returning to a higher quality stream bitrate level. The operation of at Point B differentiates from the single buffer case, and it closely associates with and follows the operation of Point A. A closer look at the boundaries of rebuffering instances, including the start and finish, is presented in FIG. 3.

Figure 3:
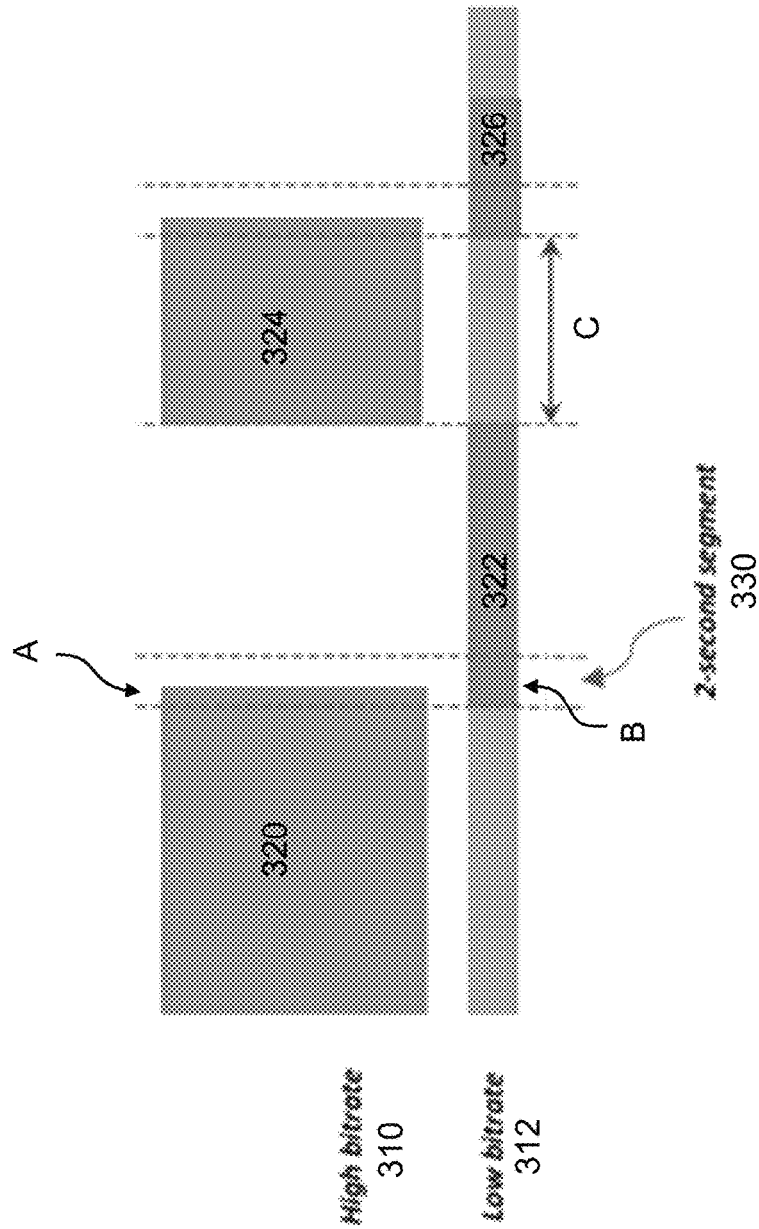
FIG. 3 depicts an illustrative scenario for delivering content segments in a dual-buffer streaming system, in accordance with some embodiments of the disclosure.

FIG. 3 depicts an illustrative scenario for delivering content segments in a dual-buffer streaming system, in accordance with some embodiments of the disclosure. Generally, FIG. 3 depicts a few operations that may occur during playout and the management of buffers. The use of 2-second segments is included as an example, and the segments serve as the basis for the operations. In some embodiments, a transition can occur from segment to segment—e.g., from a HQ segment to the next LQ segment. In some embodiments, transition can occur mid-segment where there is a transition from, e.g., a HQ segment to its corresponding LQ segment.

In chart 300 of FIG. 3, both high bitrate stream 310 and low bitrate stream 312 are streamed by a client application. In chart 300, the illustration of high bitrate 310 is simplified to be portrayed as a single bitrate, while in reality there may be a mixture of various bitrates from segment to segment, e.g., as depicted in FIG. 2, or even mid-segment. At Point A in chart 300, for example, only part of the high bitrate segment is available before rebuffering starts. Without dual streaming, this rebuffering would lead to video stalling. In some embodiments, the transition at Point A will occur when the last full HQ segment is decoded and played and, rather than playing an incomplete next HQ segment until rebuffering begins, the corresponding next LQ segment will be decoded and played. In some embodiments, the transition at Point A may occur mid-segment and a portion of the next HQ segment will be decoded and played until the buffer is empty and then the corresponding LQ segment will seamlessly be decoded and played from where the HQ segment let off.

At Point B in chart 300, there are many options on how to transition from high bitrate 310 to low bitrate 312 during a QoE disturbance (e.g., rebuffering). Some embodiments, as depicted in at Point B of chart 300, use an option of decoding dual segments of high bitrate 320 and low bitrate 322 to ensure a continuous and seamless switch. In anticipation of video stalling, the decoding of low bitrate can start along with the last incomplete segment of high bitrate. This is to eliminate the need to pause and thus to ensure continuous video play. In some embodiments, a possible significant quality downshift may be mitigated by using the approach disclosed in U.S. application Ser. No. 17/867,442 filed Jul. 18, 2022, and titled "Methods and Systems for Streaming Media Content."

Point C in chart 300 illustrates the processes of timely removal of low bitrate segments from the buffer even if those are not decoded at all, primarily due to the delivery of corresponding high bitrate segments. The low bitrate segments at Point C may be immediately removed from the buffer once the corresponding high bitrate segments 324 are received. This operation can in fact be executed for every e.g., 2-second segment.

Figure 4:
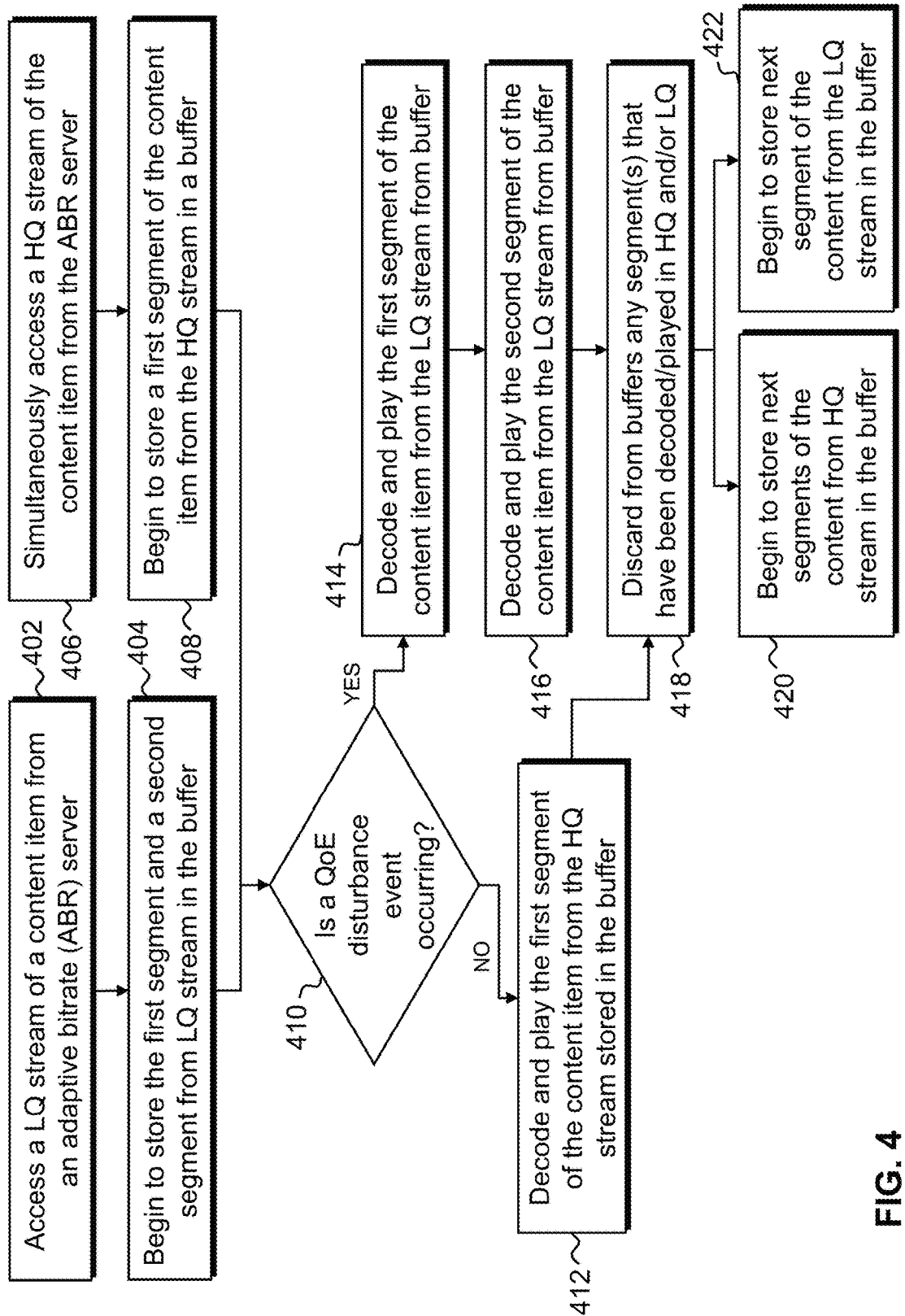
FIG. 4 depicts a flowchart of an exemplary process for delivering content segments in a dual-buffer streaming system, in accordance with some embodiments of the disclosure.

FIG. 4 depicts a flowchart of an exemplary process for delivering content segments in a dual-buffer streaming system, using a LQ stream and a HQ stream, in accordance with some embodiments of the disclosure. Some embodiments may utilize a QoE engine to perform one or more parts of process 400, e.g., as part of an application stored and executed by one or more of the processors and memory of a device and/or server such as those depicted in FIGS. 10 and 11.

At step 402, the QoE engine accesses a LQ stream of the content item from an ABR server. Generally, a client application may select a bitrate level for a movie to be streamed to a device from an ABR server. The client application may select one of the higher bitrate levels, e.g., to match available bandwidth. With two streams, the combination of the selected LQ bitrate and the selected HQ bitrate should not exceed the available bandwidth—and it may be preferable to select a LQ stream that allows streaming at a multiplicative speed faster than the HQ stream allows (e.g., streaming twice or three-times as many LQ segments as HQ segments in a same amount of time). Process 600 of FIG. 6 depicts an exemplary process for determining target bitrates to stream.

In some embodiments, the client application may access the stream at a bitrate of 145 kbps with a resolution of 416×234, which is typically the lowest bitrate, which usually allows streaming segments several times faster than streaming any of the higher quality bitrate levels. For example, if an available bandwidth is 1100 kbps, a bitrate of 730 kbps with a resolution of 768×432 may be chosen so that there is 370 kbps for the LQ stream to buffer ahead, e.g., at least double the bitrate of 145 kbps, the lowest bitrate level. In some embodiments, selecting the lowest bitrate is the most conservative approach to ensure that the LQ stream is buffered far ahead of playback. In some embodiments, the LQ stream may step up (or step down) based on available bandwidth and buffer level.

At step 404, the QoE engine begins to store the first segment and a second segment from the LQ stream in the buffer. For instance, the QoE engine may instruct input/output circuitry to capture the LQ stream (e.g., at a rate multiple times faster than the HQ stream) and store the captured LQ stream segments to memory in a buffer. In some embodiments, the buffer may be divided into at least two parts for storing HQ segments and LQ segments. In some embodiments, the client application may perform initial buffering (of both HQ and LQ) and the content item is streamed, decoded, and played for a considerable time in HQ before the possibility for a QoE disturbance event occurs (e.g., playing without interrupting due to rebuffering).

At step 406, the QoE engine simultaneously accesses a HQ stream of a content item from the ABR server. A HQ stream may be selected based on available bandwidth. In some embodiments, because two streams will be buffered, a HQ bitrate level may be selected to leave bandwidth for the LQ stream. For example, if an available bandwidth is 1500 kbps, a bitrate of 1100 kbps with a resolution of 768×432 may be chosen so that there is 400 kbps for the LQ stream to buffer ahead, e.g., about 2.75 times the bitrate of 145 kbps, the lowest bitrate level. In some embodiments, a HQ stream may be selected dynamically based on ABR algorithms.

At step 408, the QoE engine begins storing a first segment of the content item from the HQ stream in a buffer. For instance, the QoE engine may instruct input/output circuitry to capture the HQ stream and store the captured stream segments to memory in the buffer. Generally, if this fails, there is a QoE disturbance event and rebuffering is needed. In some embodiments, the client application may perform initial buffering (of both HQ and LQ) and the content item is streamed, decoded, and played for a considerable time in HQ before the possibility for a QoE disturbance event occurs (e.g., playing without interrupting due to rebuffering).

Figure 5:
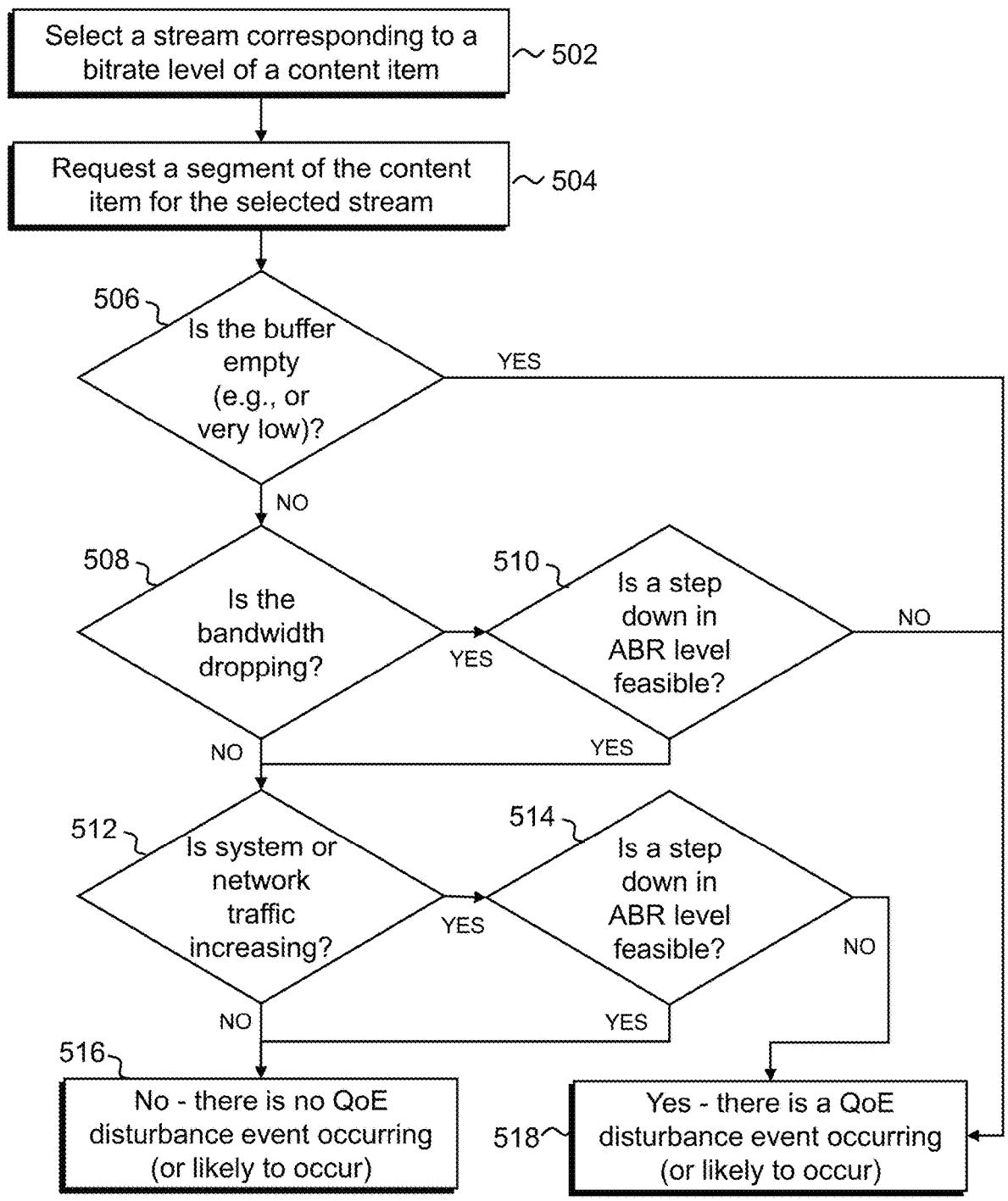
FIG. 5 depicts a flowchart of an exemplary process for determining whether a QoE disturbance event is occurring, in accordance with some embodiments of the disclosure.

At step 410, the QoE engine determines whether a QoE disturbance event (e.g., rebuffering) is occurring. In some embodiments, a QoE disturbance event like rebuffering will be apparent. In some embodiments, a QoE disturbance event, or a high likelihood for a QoE disturbance event is about to occur, may be detected based on buffer data, bandwidth data, and/or network traffic data. Process 500 of FIG. 5 depicts an exemplary process for determining whether a QoE disturbance event is occurring (or likely to occur).

If, at step 410, the QoE engine determines a QoE disturbance event is not occurring (and not about to occur) then, at step 424, the QoE engine decodes and plays (e.g., provides) the first segment of the content item from the HQ stream stored in the buffer.

If, at step 410, the QoE engine determines a QoE disturbance event is occurring (or is about to occur) then, at step 412, the QoE engine provides (e.g., decodes and plays) the first segment of the content item from the LQ stream stored in the buffer. For instance, if the client application is unable to buffer the HQ stream, rebuffering would occur and the LQ stream would be provided (e.g., decoded and played), at step 414. In some embodiments, if the HQ segment(s) may not be fully stored on the buffer, rebuffering would occur and the LQ stream would be provided Following step 414, at step 416, the QoE engine provides the second segment of the content item from the LQ stream stored in the buffer. Typically, because the LQ bitrate is so much smaller than the HQ bitrate, multiple LQ segments may be stored while a HQ segment is received and stored. In some embodiments, multiple LQ segments (e.g., third and fourth) may be buffered, decoded, and played. In some embodiments, multiple LQ segments (e.g., third and fourth) may be played during QoE disturbance events, e.g., rebuffering. In some embodiments, the HQ stream may be rebuffered quickly enough so that some or none of the second LQ segment needs to be decoded and/or played.

At step 418, the QoE engine discards from buffers the segment(s) that have been provided/played in HQ and/or LQ. Generally, a segment may be discarded from the buffer after either its HQ segment or the corresponding LQ segment is decoded and played. In some embodiments, segments may remain in the buffer for a predetermined amount of time (e.g., 45 seconds) in case of receiving a rewind, go-back, or other trick-play command. Generally, during steps 412, 414, and/or 416, the QoE engine begins to store the next segments of the content item from the HQ stream in the buffer (step 420), and begins to store the next segments of the content item from the LQ stream in the buffer (step 422). Receiving and storing the subsequent HQ and LQ segments may occur uninterruptedly and in parallel to the processes described here and shown in FIG. 4.

FIG. 5 depicts a flowchart of an exemplary process for determining whether a QoE disturbance event is occurring, in accordance with some embodiments of the disclosure. Generally, process 500 may determine if there is a QoE disturbance event for a HQ stream, e.g., in a dual-buffer system accessing a HQ stream and a LQ stream. Often rebuffering may be an indication of a QoE disturbance event. Typically, the LQ stream will rarely, if ever, stall due to rebuffering unless there is a catastrophic event for a network (e.g., connection loss). Generally, checks on buffer levels, bandwidth availability, system performance, and/or network traffic data may be performed at various times and in various orders. For instance, a rapid increase in network traffic may trigger rebuffering of a stream and/or a constriction on available bandwidth may cause rebuffering. Some embodiments may utilize a QoE engine to perform one or more parts of process 500, e.g., as part of an application stored and executed by one or more of the processors and memory of a device and/or server such as those depicted in FIGS. 10 and 11.

At step 502, a QoE engine selects a stream corresponding to a bitrate level of a content item. There are many ways for a client to select an ABR level for streaming. Generally, a client may estimate the available bandwidth at the given time and select the highest ABR level under the available bandwidth level. For instance, an exemplary ABR ladder may comprise 145 kbps with a resolution of 416×234, 365 kbps with a resolution of 640×360, 730 kbps with a resolution of 768×432, 1100 kbps with a resolution of 768×432, 2000 kbps with a resolution of 960×540, 3000 kbps with a resolution of 1280×720, 4500 kbps with a resolution of 1280×720, 6000 kbps with a resolution of 1920×1080, and 7800 kbps with a resolution of 1920×1080. Process 600 of FIG. 6 depicts an exemplary process for determining target bitrates to stream.

At step 504, the QoE engine requests a segment of the content item for the selected stream. For instance, a client application may begin to receive segments of video for a HQ stream. In some embodiments, a client application may be receiving the HQ stream for a while. Generally, if the client application cannot receive and/or buffer a segment of the stream in time, there will be an issue. In some embodiments, analyzing buffer levels, bandwidth availability, system performance, and/or network traffic data may give a warning signal as to a potential QoE event.

At step 506, the QoE engine determines whether the buffer is empty (or very low). This may indicate, e.g., that the ABR streaming is rebuffering or about to be rebuffering. For instance, an empty or very low buffer may indicate buffer underrun is occurring or imminent. In some embodiments, the QoE engine determines whether the buffer for the selected stream (e.g., an HQ stream) is empty or very low. If the QoE engine determines the buffer is empty (or very low) then, at step 518, the QoE engine outputs an indication that there is a QoE disturbance event occurring (or likely to occur). In some embodiments, a QoE disturbance event may be avoided if rebuffering is quick and/or an ABR-level stepdown allows quicker rebuffering.

At step 508, the QoE engine determines whether the available bandwidth is dropping.

If, at step 508, the QoE engine determines that the available bandwidth is dropping then, at step 510, the QoE engine determines whether a step down in ABR level is feasible. In some embodiments, a step down in ABR level may comprise multiple steps down. If a step down in ABR level is feasible then a step down is triggered and streaming continues while other QoE aspects are evaluated, e.g., with step 512. If a step down in ABR level is not feasible then, at step 518, the QoE engine outputs an indication that there is a QoE disturbance event occurring (or likely to occur).

At step 512, the QoE engine determines whether system performance and/or network traffic is increasing. For instance, if network traffic into the client is increasing, there may be less available bandwidth for streaming available. In some embodiments, if utilization percentage of system performance of the client is increasing (e.g., rapidly), there may be less resources available for streaming needs.

If, at step 514, the QoE engine determines that the system traffic and/or network traffic is increasing then, at step 510, the QoE engine determines whether a step down in ABR level is feasible. In some embodiments, a step down in ABR level may comprise multiple steps down. In some embodiments, a step down in ABR level may be a second step down (or more), e.g., if there was a prior step down due to a determination concerning bandwidth. If a step down in ABR level is feasible then a step down is triggered, streaming continues, and the process proceeds to step 516. If a step down in ABR level is not feasible then, at step 518, the QoE engine outputs an indication that there is a QoE disturbance event occurring (or likely to occur).

At step 516, the QoE engine outputs that there is no QoE disturbance event occurring (or likely to occur). This generally occurs when analyzing buffer levels, bandwidth availability, system performance, and/or network traffic data has yielded no indication that rebuffering is occurring or imminent. It may also signify that the ABR algorithms were able to adjust the bitrate of the stream (e.g., a drop down) to prevent a sudden stall of playback.

At step 518, the QoE engine outputs that there is a QoE disturbance event occurring (or likely to occur). This generally occurs when analyzing buffer levels, bandwidth availability, system performance, and/or network traffic data has yielded an indication that rebuffering is occurring or imminent. It may also signify that the ABR algorithms were not able to adjust the bitrate of the stream (e.g., a drop down) to prevent a sudden stall of playback. If a stall-preventative mode is enabled (e.g., in FIG. 6), then content may continue to be played during rebuffering or other imminent QoE disturbance event.

FIG. 6 depicts a flowchart of an exemplary process for determining target bitrates to steam in a dual-buffer content streaming system, in accordance with some embodiments of the disclosure. Some embodiments may utilize a QoE engine to perform one or more parts of process 600, e.g., as part of an application stored and executed by one or more of the processors and memory of a device and/or server such as those depicted in FIGS. 10 and 11.

Generally, FIG. 6 depicts a flowchart that can be implemented for stall-preventive delivery. The optimization often consists of multiple conflicting objectives, and it may also depend on customization and user configuration. For instance, objectives may include (1) the initial buffering can be prioritized for streaming high bitrate video, (2) the buffered low bitrate video is at least available for M-minute playout at any time after the video starts playing, and it else will require a high priority to stream, (3) the bandwidth to stream low bitrate can be determined, by considering the selected target of high bitrate, the low bitrate buffer level, etc., (4) the select target low bitrate can also vary, e.g., increased when the available bandwidth to stream the low bitrate allows streaming at a multiple of the target bitrate.

At step 602, a QoE engine determines whether "stall-preventative streaming" is enabled. In some embodiments, a stall-preventative mode may be enabled, e.g., by a viewer, a content distributor, a content producer, a server application, a content host, a preference profile etc. For instance, a dual-stream mode and/or dual-buffer mode may be enabled based on a setting for a client application, a configuration, and/or a preference. In some embodiments, a dual-stream mode and/or dual-buffer mode may be enabled based on a QoE determination such as frequency of issues with, e.g., buffer levels, bandwidth, and/or traffic. For instance, if a client application is only streaming a HQ stream but rebuffering occurs a predetermined number of times (e.g., 2) within a predetermined period of time (e.g., 30 min), then the client application may begin to simultaneously stream a HQ stream and a LQ stream and buffer both streams. In some embodiments, a dual-stream mode may be disabled if no rebuffering occurs during a predetermined amount of time (e.g., 90 minutes). In some embodiments, a mode for supplemental content to be output during HQ stream rebuffering may be enabled similarly. For instance, if a client application is only streaming a HQ stream but rebuffering occurs a predetermined number of times (e.g., 3) within a predetermined period of time (e.g., 40 min), then the client application may download a promotional video (or access a predownloaded advertisement) to playback during the next rebuffering of the HQ stream. In some embodiments, supplemental content may be pre-downloaded whether a mode for supplemental content playback during rebuffering is enabled or not.

If, at step 602, the QoE engine determines that stall-preventative streaming is not enabled then, at step 604, the QoE engine performs regular ABR streaming by, e.g., delivering segments of the target bitrate selected by optimization.

If, at step 602, the QoE engine determines that stall-preventative streaming is enabled then, at step 606, the QoE engine begins to optimize the stall-preventative streaming. For instance, the QoE engine may collect input to the functional optimization, including (i) estimated bandwidth, (ii) high bitrate buffer level (or potential playout time), and (iii) low bitrate buffer level (or potential playout time). In some embodiments, system performance and network traffic data may be used, as well. The QoE engine may optimize bitrates in various ways including using a defined cost function or using a heuristic search. In some embodiments, the QoE engine may utilize a trained model to accept bandwidth, buffer levels, and traffic data and output an optimized bitrate.

At step 608, the QoE engine outputs the results of the optimization, e.g., (i) a target of high bitrate and corresponding segments, (ii) a target of low bitrate and corresponding segments, (iii) low bitrate streaming delivery bandwidth (e.g., a multiple of the bitrate, etc.).

Generally, training a neural network to accurately optimize bitrate selection may be accomplished in many ways. Some embodiments may use supervised learning where, e.g., a training data set includes labels identifying bitrate levels, e.g., based on bandwidth, buffer levels, and traffic data. Some embodiments may use unsupervised learning that may identify target bitrate levels by clustering similar input data. Some embodiments may use semi-supervised learning where a portion of labeled device and traffic data may be combined with unlabeled bandwidth, buffer levels, and traffic data during training. In some embodiments, a reinforcement learning technique may be used. With reinforcement learning, a predictive model is trained from a series of actions by maximizing a "reward function," via rewarding correct selection and penalizing improper selection. A trained neural network may return a bitrate selection describing the input bandwidth, buffer levels, and traffic data or may simply cluster the input bandwidth, buffer levels, and traffic data with similar data inputs.

FIG. 7 depicts an illustrative streaming system with supplemental content provided during a QoE disturbance event, in accordance with some embodiments of the disclosure. Generally, scenario 700 of FIG. 7 depicts ABR streaming of content from an ABR streaming server 710 to user device 702 where supplemental content (e.g., advertisements) are pre-fetched and played during QoE events such as rebuffering. For instance, HQ stream 712 may be a spy movie, streamed from video file database 708 via ABR streaming server 710 and output as HQ output 732 on device 702, and advertisement output 734 may be a commercial/preview for a similar movie (available for on-demand purchase or rental) and one of a plurality of ads 744 downloaded from ad server 740 (which may be in communication with ABR streaming server 710 via a network). Generally, ads 744 may be any supplemental content and ad server 740 may be any content server (or even a component of ABR streaming server 710 and/or video file database 708). In some embodiments, supplemental content may comprise advertisements, commercials, promos, previews, behind-the-scenes clips, interviews, news, or other content.

In some embodiments, by receiving high quality (HQ) stream 712 from ABR streaming server 710 and ads 744 from ad server 740, device 702 can the stream in HQ buffer 722 and store ads 744 in ad buffer 724, respectively, and output advertisements from ad buffer 724 in cases where HQ buffer 722 stalls, e.g., due to rebuffering. Device 702 may provide HQ output 732, e.g., during times of steady bandwidth and may provide advertisements output 734 during times of HQ stream rebuffering. Exemplary HQ output 732 is depicted as coming from a stream of 4500 kbps with 1280×720 resolution. Exemplary advertisement output 734 is also depicted as coming from a stream of 4500 kbps with 1280×720 resolution. Device 702 is depicted as a television but may generally be any streaming client device (or client application running on a device), e.g., such as those depicted in FIGS. 10 and 11. ABR streaming server 710, along with video file database, are depicted as cloud devices but may generally be any device or application run on a device, e.g., such as those depicted in FIGS. 10 and 11.

In some embodiments, ABR streaming server 710 will be in communication, via a network, with video file database 708. In some embodiments, video file database 708 may store different quality versions of each content item (e.g., video file), and each version of a content item as individual segments to be requested by an ABR client on device 702 via ABR streaming server 710. For instance, one film may comprise 10 different quality level versions (e.g., ranging from 145 kbps with a resolution of 416×234 to 85 Mbps for high frame rate 4K resolution) and each version may be divided up into segments ranging, e.g., 2-10 seconds in duration.

In scenario 700, a client application requests from ABR streaming server 710 to receive a stream with a HQ bitrate 712, which is delivered to device 702 and stored in HQ buffer 722. In some embodiments, HQ stream 712 may be dynamically adapting bitrates.

In scenario 700, ad server 740 delivers ads 744 to device 702 and stored in ad buffer 724. In some embodiments, ads 744 may be any supplemental content such as advertisements, commercials, promos, previews, behind-the-scenes clips, interviews, news, or other content. Supplemental content items may be various durations. For instance, advertisements that are 5-15 seconds may be appropriate as QoE disturbance events (e.g., rebuffering) may be short and multiple ads may be played if the QoE disturbance event ends of having a longer duration. In some embodiments, supplemental content may be pre-fetched, downloaded simultaneously with a stream, downloaded via another stream, downloaded in a prior session, or otherwise provided via a content distribution network to be ready for playback upon a QoE disturbance event (e.g., rebuffering).

In some embodiments, ads 744 and/or locations for each of ads 744 may be identified in a manifest file. For instance, a manifest file, downloaded before and/or during streaming, may identify URLs for ads 744 to access, download, and queue ads 744 for playback during a QoE disturbance event. In some embodiments, URLs for each of ads 744 may be included in a manifest file for HQ stream 712. In some embodiments, URLs for each of ads 744 may be included in a separate supplemental content manifest file. In some embodiments, a manifest file for supplemental content may be transmitted before streaming and/or updated periodically during streaming. For instance, a new manifest file for supplemental content may be downloaded ahead of each scheduled break and content/advertisements can be pre-loaded in case of a QoE disturbance event or a commercial break. Scenario 800 of FIG. 8 depicts an exemplary manifest file.

Generally, HQ output 732 may be played unless HQ buffer 722 is depleted and then pre-downloaded supplemental content may be output during rebuffering. For example, in scenario 700, with a steady bandwidth, a client application of device 702 may typically play the stream at the HQ bitrate 712, e.g., as HQ output 732; however, at times when there is insufficient data in HQ buffer 722, the next item of ads 744 from ad buffer 724 may be played back seamlessly, e.g., as advertisement output 734. Content items from ad buffer 724 may be played back until HQ buffer 722 is ready after rebuffering. In some embodiments, only a portion of a supplement content item may be provided, e.g., if rebuffering is quick.

Streaming an additional LQ stream may use bandwidth that would otherwise be available for a HQ stream, but a LQ stream may be by a large factor smaller than the HQ stream. For instance, with a 6 Mbps bandwidth an ABR client may select a bitrate level of 6000 kbps with a resolution of 1920×1080, with the stream stepping down to 4500 kbps with a resolution of 1280×720 or 3000 kbps with a resolution of 1280×720 if bandwidth is restricted at times. However, even with ABR adjustments, rebuffering may still occur, so a dual stream solution may affect the HQ bitrate selection.

In some embodiments, all advertisements for a program will be downloaded from an ad server and inserted at the client-side application, e.g., at appropriate breaks determined by a manifest file. For instance, HQ stream 712 may include a manifest file identifying commercial breaks where advertisements may be inserted by a client application at device 702. In such cases, ads 744 may be delivered to a queue in ad buffer 724 to be played during a QoE disturbance event (e.g., rebuffering) or at the next commercial break.

In some embodiments, advertisements will be inserted at the server. For instance, HQ stream 712 may include advertisements inserted by ABR streaming server 710. Many streaming approaches may include advertisements in a program at the server rather than at the client to avoid potential issues with ad-blocking software. In such cases with server-side ad insertion, ad server 740 may need to communicate with ABR server 710 regarding which ads have been played. Ad server 740 and/or ABR streaming server 710 may update and transmit one or more manifest files to adjust advertisements (or the order of ads) downloaded and/or queued at ad buffer 724. Scenario 800 of FIG. 8 depicts an exemplary manifest file.

FIG. 8 depicts an illustrative scenario of a streaming system with supplemental content decoded and played during a QoE disturbance event, in accordance with some embodiments of the disclosure. Generally, the chart 200 in scenario 800 of FIG. 8 depicts buffer level condition 820 over streaming time 810. Buffer level condition 820 is shown as having one of two conditions: sufficient condition 822 and insufficient condition 824. In some embodiments, such as with ad-supported video streaming, ads can be added and played when rebuffering leads to video stalling. In scenario 800, the supplemental content being played are advertisements, but any supplemental content may be inserted similarly.

Advertising videos are usually downloaded and played back in high quality. There would be significantly reduced value for ads to be played in low quality. More importantly, viewers may be annoyed and sponsors may be negatively impacted if promotional ads do not play continuously, smoothly, and approximate the quality of the streamed video. Ads may be personalized or targeted for viewers based on, e.g., certain user interests, locations, demographics, etc. Some embodiments may feature bumper ads, e.g., short (e.g., up to 6 seconds) and non-skippable video ads.

Longer non-skippable ads may be 15-20 seconds in length. In some embodiments, ads may be presented in an overlay, which can be applied to part of or an entire video.

FIG. 8 depicts a situation with insertion of ads in the events of rebuffering. Streaming video playback can resume when the client receives sufficient bits and decoding commences again. In scenario 800, during initial buffering 832, starting at time 0, there is insufficient data in the buffer. Prior to (or during) buffering, a few supplemental content items, e.g., Ad_1 842, Ad_2 844, Ad_3 846, and/or Ad_n 854, may be downloaded. With initial buffering 832, the client buffers a HQ stream, e.g., at 4500 kbps. Next, the streaming video begins playing, e.g., indicated as video playing 834. With video playing 834, the HQ stream is streamed until the buffer level condition 820 is insufficient 824, at T1. At T1, during rebuffering 836, Ad_1 is played back. In some embodiments, multiple ads may be played back until the buffer level condition 820 is sufficient 822. After rebuffering 836, when buffer level condition 820 is sufficient 822, the HQ stream is streamed until buffer level condition 820 is again insufficient 824, at T2. Rebuffering occurs at T2 and Ad_2 is played back. After rebuffering again, when buffer level condition 820 is sufficient 822, the HQ stream resumes until buffer level condition 820 is again insufficient 824, at T3. Rebuffering occurs at T3 and Ad_3 is played back. After rebuffering, the buffer is sufficient 822 again and the process continues. In some embodiments, during the rebuffering, the playout of cached content on the local drive of mobile device may be personalized.

In some embodiments, multiple ads may be downloaded and available on a local device during video streaming. The ads can be played and replayed at any time. However, in many cases, it may be undesirable and annoying to repeat playing a same advertisement (e.g., too frequently). In some embodiments an ad server and a streaming server are in communication, e.g., to ensure ads are not repeated too frequently and/or too many times.

In some embodiments, a manifest file, such as manifest file 840 of FIG. 8, may be used to identify supplemental content to be played during QoE disturbance events, such as rebuffering. In FIG. 8, manifest file 840 comprises identifiers and URLs for each advertisement, e.g., for client-side downloading and insertion during QoE disturbance events. For instance, manifest file 840 comprises information for supplemental content items Ad_1 842, Ad_2 844, Ad_3 846, and Ad_n 854, as well as a promotional clip, Promo_4 848, a preview clip, Preview_5 850, and a behind-the-scenes clip, BTS_6 852. In some embodiments, manifest file 840 may comprise a supplemental content queue 860.

In some embodiments, manifest file 840 may be incorporated as part of another manifest file, e.g., used for the ABR streaming segments. In some embodiments, manifest file 840 may be a separate manifest file from the streaming manifest files. In some embodiments, manifest file 840 may be updated and transmitted to the client application at a regular interval. In some embodiments, communication between the streaming server and client may allow updating an advertising manifest file, e.g., for movement of commercial timeslots. For instance, if Ad_7 were to be scheduled to be presented at a future commercial break, but is instead presented during rebuffering, the client application may notify the streaming server to avoid inserting Ad_7 (avoiding the repeat) and play Ad 8.

Figure 9:
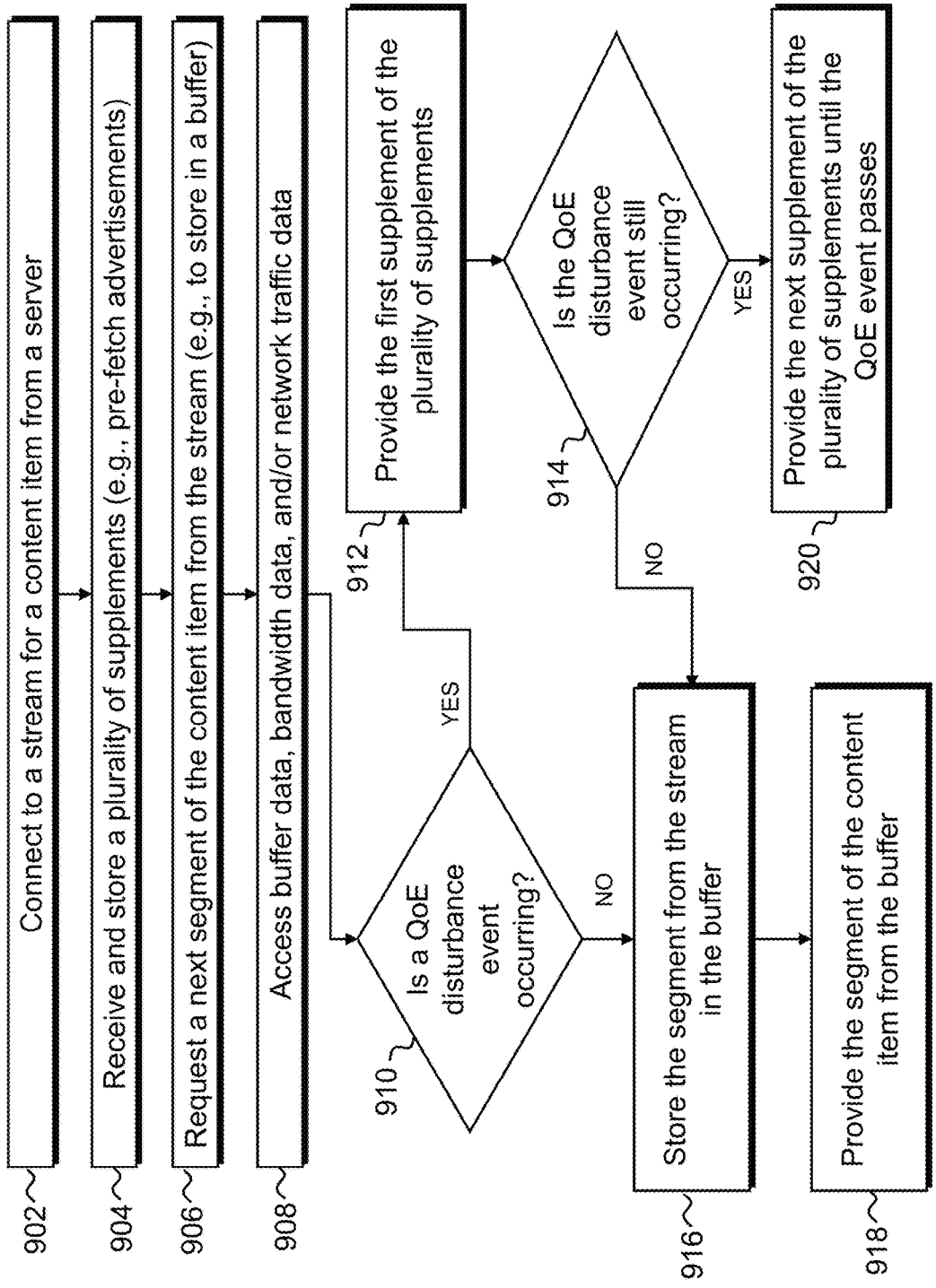
FIG. 9 depicts a flowchart of an exemplary process for delivering content segments with supplemental content provided during a QoE disturbance event, in accordance with some embodiments of the disclosure.

FIG. 9 depicts a flowchart of an exemplary process for delivering content segments with supplemental content decoded and played during a QoE disturbance event, in accordance with some embodiments of the disclosure. Some embodiments may utilize a QoE engine to perform one or more parts of process 900, e.g., as part of an application stored and executed by one or more of the processors and memory of a device and/or server such as those depicted in FIGS. 10 and 11.

At step 902, a QoE engine connects to a stream for a content item from a server.

At step 904, the QoE engine receives and stores a plurality of supplemental content item. For instance, the QoE engine may pre-fetch advertisements, commercials, promos, previews, behind-the-scenes clips, interviews, news, or other content. Such supplemental content will be queued to play during a QoE disturbance event, e.g., rebuffering.

At step 906, the QoE engine requests a next segment of the content item from the stream, e.g., to store in a buffer.

At step 908, the QoE engine accesses buffer data, bandwidth data, and/or network traffic data.

At step 910, the QoE engine determines whether a QoE disturbance event (e.g., rebuffering) is occurring. In some embodiments, a QoE disturbance event like rebuffering will be apparent. In some embodiments, a QoE disturbance event, or a high likelihood for a QoE disturbance event is about to occur, may be detected based on buffer data, bandwidth data, and/or network traffic data. Process 500 of FIG. 5 depicts an exemplary process for determining whether a QoE disturbance event is occurring (or likely to occur).

If, at step 910, the QoE engine determines a QoE disturbance event is occurring (or is about to occur) then, at step 912, the QoE engine provides the first supplement of the plurality of supplements.

After step 912, at step 914, the QoE engine determines whether the QoE disturbance event is still occurring. For instance, the content may still be rebuffering even after the first supplemental content item have the QoE disturbance event is still occurring If, at step 914, the QoE engine determines the QoE disturbance event is still occurring then, at step 920, the QoE engine provides the next supplement of the plurality of supplements until the QoE event passes.

If, at step 910, the QoE engine determines a QoE disturbance event is not occurring (and is not about to occur) or, at step 914, the QoE engine determines the QoE disturbance event is no longer occurring, then, at step 916, the QoE engine stores the segment from the stream in the buffer. Generally, the ABR client may buffer the segment from the content as soon as it is able.

At step 918, the QoE engine provides the segment of the content item from the buffer.

Figure 10:
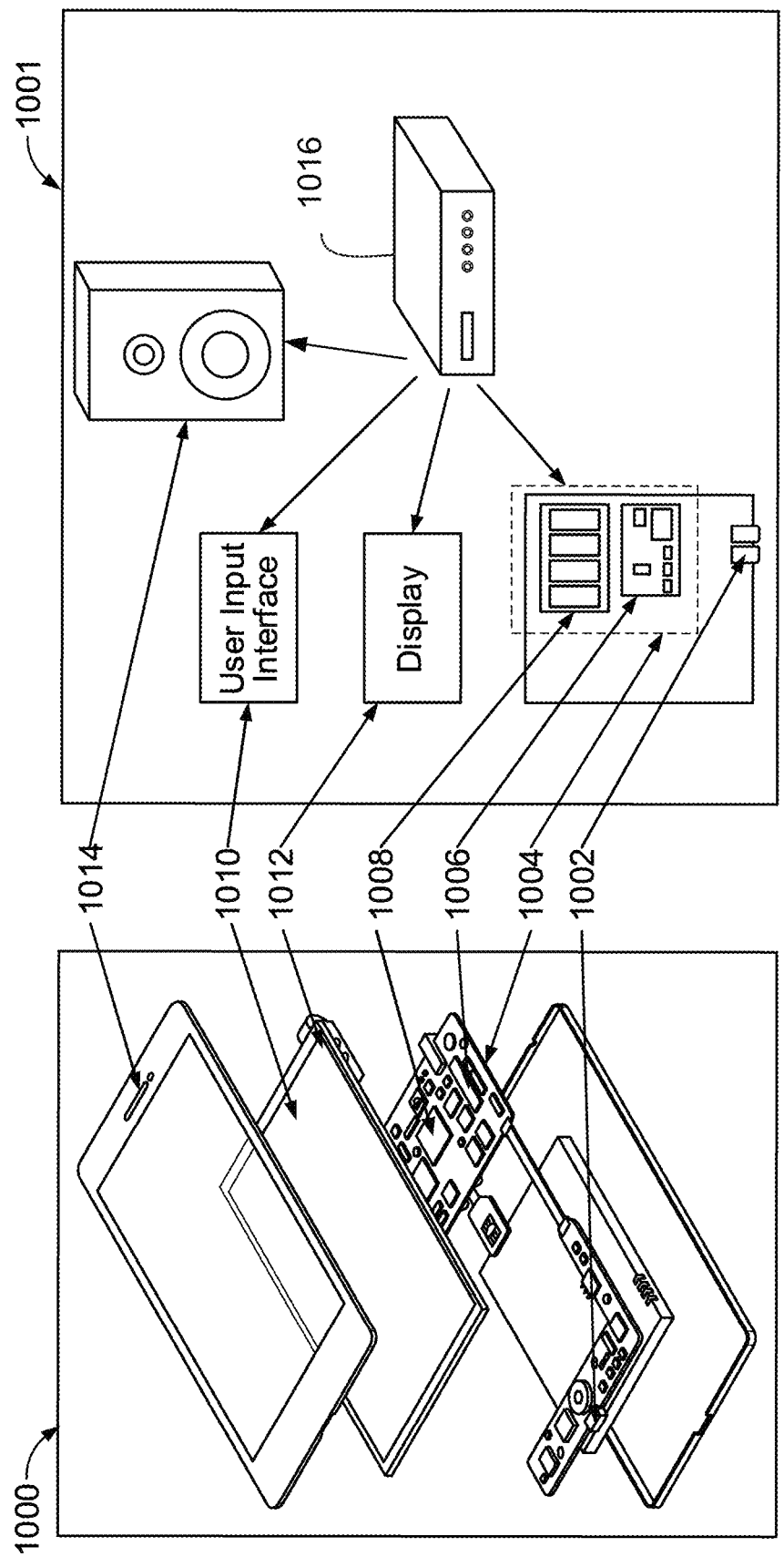
FIG. 10 is a diagram of illustrative devices, in accordance with some embodiments of the disclosure.

FIG. 10 is a diagram of an illustrative device, in accordance with some embodiments of the disclosure. Device 1000 may be implemented by a device or system, e.g., a device providing a display to a user, or any other suitable control circuitry configured to generate a display to a user of content. For example, device 1000 of FIG. 10 can be implemented as equipment 1001. In some embodiments, equipment 1001 may include set-top box 1016 that includes, or is communicatively coupled to, display 1012, audio equipment 1014 (e.g., speakers or headphones), microphone 1016, camera 1018, and user input interface 1010. In some embodiments, display 1012 may include a television display or a computer display. In some embodiments, user interface input 1010 is a remote-control device. Set-top box 1016 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path. Each one of device 1000 and equipment 1001 may receive content and receive data via input/output (hereinafter "I/O") path 1002. I/O path 1002 may provide content and receive data to control circuitry 1004, which includes processing circuitry 1006 and storage 1008. Control circuitry 1004 may be used to send and receive commands, requests, and other suitable data using I/O path 1002. I/O path 1002 may connect control circuitry 1004 (and specifically processing circuitry 1006) to one or more communication paths (described below). I/O functions may be provided by one or more of these communication paths but are shown as a single path in FIG. 10 to avoid overcomplicating the drawing. While set-top box 1016 is shown in FIG. 10 for illustration, any suitable computing device having processing circuitry, control circuitry, and storage may be used in accordance with the present disclosure. For example, set-top box 1016 may be replaced by, or complemented by, a personal computer (e.g., a notebook, a laptop, a desktop), a smartphone (e.g., device 1000), a tablet, a network-based server hosting a user-accessible client device, a non-user-owned device, any other suitable device, or any combination thereof.

Control circuitry 1004 may be based on any suitable processing circuitry such as processing circuitry 1006. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1004 executes instructions for an application QoE engine stored in memory (e.g., storage 1008). Specifically, control circuitry 1004 may be instructed by the application to perform the functions discussed above and below. For example, the application may provide instructions to control circuitry 1004 to generate the content guidance displays. In some implementations, any action performed by control circuitry 1004 may be based on instructions received from the application.

In some client/server-based embodiments, control circuitry 1004 includes communications circuitry suitable for communicating with an application server. A QoE engine may be a stand-alone application implemented on a device or a server. A QoE engine may be implemented as software or a set of executable instructions. The instructions for performing any of the embodiments discussed herein of the QoE engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 10, the instructions may be stored in storage 1008, and executed by control circuitry 1004 of a device 1000.

In some embodiments, a QoE engine may be a client/server application where only the client application resides on device 1000 (e.g., devices 1102), and a server application resides on an external server (e.g., server 1106). For example, a QoE engine may be implemented partially as a client application on control circuitry 1004 of device 1000 and partially on server 1106 as a server application running on control circuitry. Server 1106 may be a part of a local area network with one or more of devices 1102 or may be part of a cloud computing environment accessed via the internet. In a cloud computing environment, various types of computing services for performing searches on the internet or informational databases, providing storage, or parsing data are provided by a collection of network-accessible computing and storage resources (e.g., server 1106), referred to as "the cloud." Device 1000 may be a cloud client that relies on the cloud computing capabilities from server 1106 to access profiles, enhance content items, and provide content by the QoE engine. When executed by control circuitry of server 1106, the QoE engine may instruct the control circuitry to generate the QoE engine output (e.g., determining QoE disturbance events, selecting bitrates for streaming, triggering buffering of a stream, etc.) and transmit the generated output to one or more of devices 1102. The client application may instruct control circuitry of the receiving device 1102 to generate the QoE engine output. Alternatively, one or more of devices 1102 may perform all computations locally via control circuitry 1004 without relying on server 1106.

Control circuitry 1004 may include communications circuitry suitable for communicating with a QoE engine server, a client, or other networks or servers. The instructions for carrying out the above-mentioned functionality may be stored and executed on the application server 1106. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device such as storage 1008 that is part of control circuitry 1004. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 1008 may be used to store various types of content described herein as well as content guidance data described above. Nonvolatile memory may also be used (e.g., to launch a boot-up routine and other instructions). Cloud-based storage, for example, (e.g., on server 1106) may be used to supplement storage 1008 or instead of storage 1008.

A user may send instructions to control circuitry 1004 using user input interface 1010. User input interface 1010, display 1012 may be any suitable interface such as a touchscreen, touchpad, or stylus and/or may be responsive to external device add-ons, such as a remote control, mouse, trackball, keypad, keyboard, joystick, voice recognition interface, or other user input interfaces. Display 1010 may include a touchscreen configured to provide a display and receive haptic input. For example, the touchscreen may be configured to receive haptic input from a finger, a stylus, or both. In some embodiments, equipment device 1000 may include a front-facing screen and a rear-facing screen, multiple front screens, or multiple angled screens. In some embodiments, user input interface 1010 includes a remote-control device having one or more microphones, buttons, keypads, any other components configured to receive user input or combinations thereof. For example, user input interface 1010 may include a handheld remote-control device having an alphanumeric keypad and option buttons. In a further example, user input interface 1010 may include a handheld remote-control device having a microphone and control circuitry configured to receive and identify voice commands and transmit information to set-top box 1016.

Audio equipment 1010 may be integrated with or combined with display 1012. Display 1012 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 1012. Audio equipment 1014 may be provided as integrated with other elements of each one of device 1000 and equipment 1001 or may be stand-alone units. An audio component of videos and other content displayed on display 1012 may be played through speakers (or headphones) of audio equipment 1014. In some embodiments, audio may be distributed to a receiver (not shown), which processes and outputs the audio via speakers of audio equipment 1014. In some embodiments, for example, control circuitry 1004 is configured to provide audio cues to a user, or other audio feedback to a user, using speakers of audio equipment 1014. There may be a separate microphone 1016 or audio equipment 1014 may include a microphone configured to receive audio input such as voice commands or speech. For example, a user may speak letters or words that are received by the microphone and converted to text by control circuitry 1004. In a further example, a user may voice commands that are received by a microphone and recognized by control circuitry 1004. Camera 1018 may be any suitable video camera integrated with the equipment or externally connected. Camera 1018 may be a digital camera comprising a charge-coupled device (CCD) and/or a complementary metal-oxide semiconductor (CMOS) image sensor. Camera 1018 may be an analog camera that converts to digital images via a video card.

An application (e.g., for generating a display) may be implemented using any suitable architecture. For example, a stand-alone application may be wholly implemented on each one of device 1000 and equipment 1001. In some such embodiments, instructions of the application are stored locally (e.g., in storage 1008), and data for use by the application is downloaded on a periodic basis (e.g., from an out-of-band feed, from an Internet resource, or using another suitable approach). Control circuitry 1004 may retrieve instructions of the application from storage 1008 and process the instructions to generate any of the displays discussed herein. Based on the processed instructions, control circuitry 1004 may determine what action to perform when input is received from input interface 1010. For example, movement of a cursor on a display up/down may be indicated by the processed instructions when input interface 1010 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 1004 may allow a user to provide user profile information or may automatically compile user profile information. For example, control circuitry 1004 may access and monitor network data, video data, audio data, processing data, participation data from a participant profile. In some embodiments, control circuitry 1004 may calculate several scores, such as a readiness score, based on profile data. Control circuitry 1004 may store scores in a database and the database may be linked to a user profile. Additionally, control circuitry 1004 may obtain all or part of other user profiles that are related to a particular user (e.g., via social media networks), and/or obtain information about the user from other sources that control circuitry 1004 may access. As a result, a user can be provided with a unified experience across the user's different devices.

In some embodiments, the application is a client/server-based application. Data for use by a thick or thin client implemented on each one of device 1000 and equipment 1001 is retrieved on-demand by issuing requests to a server remote from each one of device 1000 and equipment 1001. For example, the remote server may store the instructions for the application in a storage device. The remote server may process the stored instructions using circuitry (e.g., control circuitry 1004) and generate the displays discussed above and below. The client device may receive the displays generated by the remote server and may display the content of the displays locally on device 1000. This way, the processing of the instructions is performed remotely by the server while the resulting displays (e.g., that may include text, a keyboard, or other visuals) are provided locally on device 1000. Device 1000 may receive inputs from the user via input interface 1010 and transmit those inputs to the remote server for processing and generating the corresponding displays. For example, device 1000 may transmit a communication to the remote server indicating that an up/down button was selected via input interface 1010. The remote server may process instructions in accordance with that input and generate a display of the application corresponding to the input (e.g., a display that moves a cursor up/down). The generated display is then transmitted to device 1000 for presentation to the user.

Figure 11:
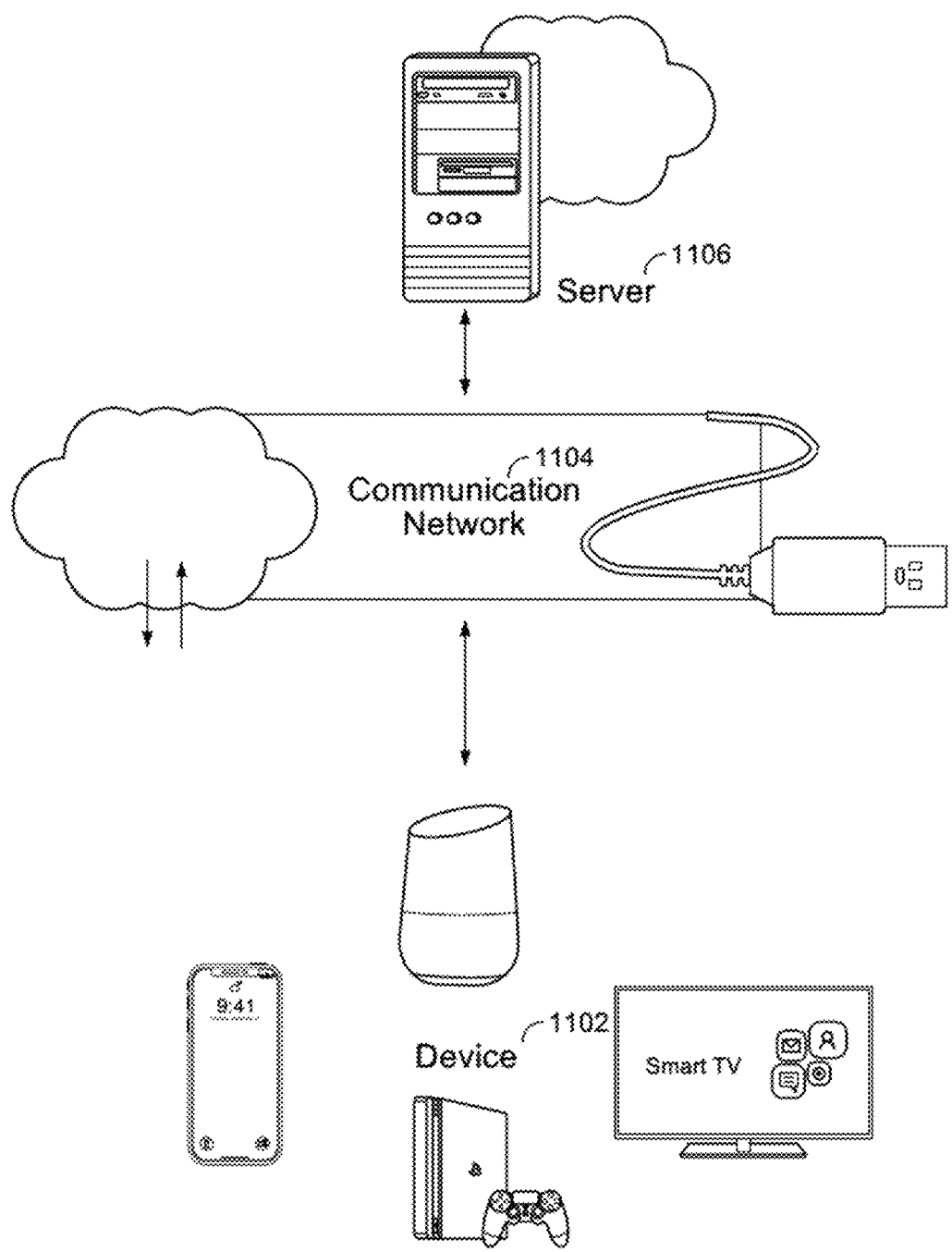
FIG. 11 is a diagram of an illustrative system, in accordance with some embodiments of the disclosure.

As depicted in FIG. 11, one or more of devices 1102 may be coupled to communication network 1104. Communication network 1104 may be one or more networks including the internet, a mobile phone network, mobile voice or data network (e.g., a 5G or 4G or LTE network), cable network, public switched telephone network, Bluetooth, or other types of communication network or combinations of communication networks. Thus, devices 1102 may communicate with server 1106 over communication network 1104 via communications circuitry described above. In should be noted that there may be more than one server 1106, but only one is shown in FIG. 11 to avoid overcomplicating the drawing. The arrows connecting the respective device(s) and server(s) represent communication paths, which may include a satellite path, a fiber-optic path, a cable path, a path that supports internet communications (e.g., IPTV), freespace connections (e.g., for broadcast or other wireless signals), or any other suitable wired or wireless communications path or combination of such paths.

In some embodiments, the application is downloaded and interpreted or otherwise run by an interpreter or virtual machine (e.g., run by control circuitry 1004). In some embodiments, the application may be encoded in the ETV Binary Interchange Format (EBIF), received by control circuitry 1004 as part of a suitable feed, and interpreted by a user agent running on control circuitry 1004. For example, the application may be an EBIF application. In some embodiments, the application may be defined by a series of JAVA-based files that are received and run by a local virtual machine or other suitable middleware executed by control circuitry 1004.

The systems and processes discussed above are intended to be illustrative and not limiting. Although example embodiments are described above, the various features and steps may be combined, divided, omitted, and/or augmented in any desired manner, depending on the specific outcome and/or application. One skilled in the art would appreciate that the actions of the processes discussed herein may be omitted, modified, combined, and/or rearranged, and any additional actions may be performed without departing from the scope of the invention. Various alterations, modifications, and improvements will readily occur to those skilled in art. Such alterations, modifications, and improvements as are made obvious by this disclosure are intended to be part of this description though not expressly stated herein and are intended to be within the spirit and scope of the disclosure. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. The foregoing description is by way of example only, and not limiting. This patent is limited only as defined in the following claims and equivalents thereto.

What is claimed is:

1. A method of preventing stalling when streaming adaptive bitrate (ABR) content, the method comprising:
   contemporaneously receiving, from a server, a low quality (LQ) stream of a content item and a high quality (HQ) stream of the content item, wherein the LQ stream has a lower bitrate than a bitrate of the HQ stream;
   instructing to store in a second buffer, from the LQ stream, a first LQ segment corresponding to a first portion of the content item and a second LQ segment from the LQ stream corresponding to a second portion of the content item consecutively following the first portion of the content item and contemporaneously instructing to store in a first buffer a HQ segment corresponding to the first portion of the content item from the HQ stream;
   providing for consumption the first HQ segment from the first buffer and discarding from the second buffer the first LQ segment while the first HQ segment from the first buffer is provided;
   while attempting to access, from the HQ stream, a second HQ segment corresponding to the second portion of the content item immediately following the first portion of the content item, determining a quality of experience (QoE) disturbance event is occurring where the second HQ segment is inaccessible from the HQ stream; and
   in response to determining that the QoE disturbance event is occurring, providing for consumption from the second buffer the second LQ segment corresponding to the second portion of the content item consecutively following the first portion of the content item immediately following the providing for consumption of the first HQ segment corresponding to the first portion of the content item from the first buffer.

2. The method of claim 1, wherein the providing from the second buffer the first LQ segment for consumption further comprises:
   determining whether the QoE disturbance event is still occurring;
   in response to determining that the QoE disturbance event is still occurring, providing from the second buffer the second LQ segment for consumption; and
   in response to determining that the QoE disturbance event is not still occurring:
   (i) instructing to store in the first buffer a second HQ segment corresponding to the portion following the first portion of the content item from the HQ stream; and
   (ii) providing from the first buffer the second HQ segment for consumption.

3. The method of claim 1, wherein the QoE disturbance event comprises rebuffering.

4. The method of claim 1, wherein the determining whether the QoE disturbance event is occurring or about to occur further comprises:
   accessing data describing a buffer level; and
   determining whether the data describing the buffer level is above a predetermined buffer threshold.

5. The method of claim 1, wherein the determining whether the QoE disturbance event is occurring or about to occur further comprises:
   accessing data describing available bandwidth; and
   determining whether the data describing the available bandwidth is above a predetermined bandwidth threshold.

6. The method of claim 1, wherein the determining whether the QoE disturbance event is occurring or about to occur further comprises:
   accessing data describing network traffic; and
   determining whether the data describing the network traffic is above a predetermined traffic threshold.

7. The method of claim 1, wherein the first buffer and the second buffer are components of a dual-buffer system.

8. The method of claim 1, wherein the receiving, from the server, the HQ stream of the content item further comprises:
   accessing, from the server, data describing a plurality of streams of the content item, each of the plurality of streams associated with a respective bitrate;
   determining an available bandwidth; and
   selecting the HQ stream and the LQ stream from the plurality of streams of the content item such that the sum of the respective bitrate for the HQ stream and a multiple of the respective bitrate for the LQ stream totals less than the available bandwidth, wherein the multiple is greater than one.

9. The method of claim 1, wherein the receiving, from the server, the LQ stream of the content item further comprises:
   accessing, from the server, data describing a plurality of streams of the content item, each of the plurality of streams associated with a respective bitrate; and selecting as the LQ stream a stream from the plurality of streams of the content item with a respective bitrate that is least.

10. The method of claim 1, wherein the providing from the second buffer the first LQ segment for consumption further comprises:
discarding the first LQ segment from the second buffer; and
discarding the first HQ segment from the first buffer; and
wherein the providing from the first buffer the first HQ segment for consumption further comprises:
discarding the first LQ segment from the second buffer; and
discarding the first HQ segment from the first buffer.

11. A system for preventing stalling when streaming adaptive bitrate (ABR) content, the system comprising:
memory comprising a first buffer and a second buffer; and
control configured to:
contemporaneously receive, from a server, a low quality (LQ) stream of a content item and a high quality (HQ) stream of the content item, wherein the LQ stream has a lower bitrate than a bitrate of the HQ stream; and
instruct to store in a second buffer, from the LQ stream, a first LQ segment corresponding to a first portion of the content item and a second LQ segment from the LQ stream corresponding to a second portion of the content item consecutively following the first portion of the content item and contemporaneously instructing to store in a first buffer a HQ segment corresponding to the first portion of the content item from the HQ stream;
provide for consumption the first HQ segment from the first buffer and discarding from the second buffer the first LQ segment while the first HQ segment from the first buffer is provided;
while attempting to access, from the HQ stream, a second HQ segment corresponding to the second portion of the content item immediately following the first portion of the content item, determine a quality of experience (QoE) disturbance event is occurring where the second HQ segment is inaccessible from the HQ stream; and
in response to determining that the QoE disturbance event is occurring, provide for consumption from the second buffer the second LQ segment corresponding to the second portion of the content item consecutively following the first portion of the content item immediately following the providing for consumption of the first HQ segment corresponding to the first portion of the content item from the first buffer.

12. The system of claim 11, wherein the processing circuitry is further configured to cause to be provided from the second buffer the first LQ segment for consumption further by:
determining whether the QoE disturbance event is still occurring;
in response to determining that the QoE disturbance event is still occurring, providing from the second buffer the second LQ segment for consumption; and
in response to determining that the QoE disturbance event is not still occurring:
(i) instructing to store in the first buffer a second HQ segment corresponding to the portion following the first portion of the content item from the HQ stream; and (ii) providing from the first buffer the second HQ segment for consumption.

13. The system of claim 11, wherein the QoE disturbance event comprises rebuffering.

14. The system of claim 11, wherein the processing circuitry is further configured to determine whether the QoE disturbance event is occurring or about to occur by:
accessing data describing a buffer level; and
determining whether the data describing the buffer level is above a predetermined buffer threshold.

15. The system of claim 11, wherein the processing circuitry is further configured to determine whether the QoE disturbance event is occurring or about to occur by:
accessing data describing available bandwidth; and
determining whether the data describing the available bandwidth is above a predetermined bandwidth threshold.

16. The system of claim 11, wherein the processing circuitry is further configured to determine whether the QoE disturbance event is occurring or about to occur by:
accessing data describing network traffic; and
determining whether the data describing the network traffic is above a predetermined traffic threshold.

17. The system of claim 11, wherein the memory further comprises a dual-buffer system comprising the first buffer and the second buffer.

18. The system of claim 11, wherein the input/output circuitry is further configured to receive, from the server, the HQ stream of the content item further by:
accessing, from the server, data describing a plurality of streams of the content item, each of the plurality of streams associated with a respective bitrate; and
wherein the processing circuitry is further configured to:
determine an available bandwidth; and
select the HQ stream and the LQ stream from the plurality of streams of the content item such that the sum of the respective bitrate for the HQ stream and a multiple of the respective bitrate for the LQ stream totals less than the available bandwidth, wherein the multiple is greater than one.

19. The system of claim 11, wherein the input/output circuitry is further configured to receive, from the server, the HQ stream of the content item further by:
accessing, from the server, data describing a plurality of streams of the content item, each of the plurality of streams associated with a respective bitrate; and
wherein the processing circuitry is further configured to:
select as the LQ stream a stream from the plurality of streams of the content item with a respective bitrate that is least.

20. The system of claim 11, wherein the processing circuitry is further configured to cause to be provided from the second buffer the first LQ segment for consumption by:
discarding the first LQ segment from the second buffer; and
discarding the first HQ segment from the first buffer; and
wherein the processing circuitry is further configured to cause to be provided from the first buffer the first HQ segment for consumption by:
discarding the first LQ segment from the second buffer; and
discarding the first HQ segment from the first buffer.

* * * * *